(12) United States Patent
Chang et al.

(10) Patent No.: US 12,170,758 B2
(45) Date of Patent: Dec. 17, 2024

(54) OVERLAPPED BLOCK MOTION COMPENSATION

(71) Applicant: QUALCOMM Incorporated, San Diego, CA (US)

(72) Inventors: Yao-Jen Chang, San Diego, CA (US); Jingya Li, Munich (DE); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 193 days.

(21) Appl. No.: 17/534,325

(22) Filed: Nov. 23, 2021

(65) Prior Publication Data

US 2022/0201282 A1     Jun. 23, 2022

Related U.S. Application Data

(60) Provisional application No. 63/129,238, filed on Dec. 22, 2020.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/521* (2014.11); *H04N 19/573* (2014.11)

(58) Field of Classification Search
CPC .. H04N 19/105; H04N 19/139; H04N 19/176; H04N 19/521; H04N 19/573; H04N 19/463; H04N 19/583
See application file for complete search history.

(56) References Cited

U.S. PATENT DOCUMENTS

| 2005/0078755 A1* | 4/2005 | Woods | H04N 19/615 |
| | | | 375/240.24 |
| 2018/0098086 A1* | 4/2018 | Chuang | H04N 19/61 |
| 2020/0288168 A1* | 9/2020 | Zhang | H04N 19/583 |

FOREIGN PATENT DOCUMENTS

| WO | WO-2020016857 A1 * | 1/2020 | ......... H04N 19/117 |
| WO | 2020147747 A1 | 7/2020 | |

OTHER PUBLICATIONS

Chen J., et al., "Algorithm Description of Joint Exploration Test Model 7 (JEM7)", 119 . MPEG Meeting, 7. JVET Meeting, Jul. 13, 2017-Jul. 21, 2017,, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, Aug. 19, 2017, XP030150980, 48 Pages.

(Continued)

*Primary Examiner* — Francis Geroleo
(74) *Attorney, Agent, or Firm* — Polsinelli LLP

(57) ABSTRACT

Systems and techniques are provided for overlapped block motion compensation (OBMC). A method can include determining an OBMC mode is enabled for a current subblock of video data; for a neighboring subblock(s) adjacent to the current subblock, determining whether a first, second and third condition are met, the first condition comprising that all reference picture lists for predicting the current subblock are used to predict the neighboring subblock; the second condition comprising that identical reference pictures are used to determine motion vectors associated with the current subblock and the neighboring subblock, and the third condition comprising that a difference between motion vectors of the current subblock and the neighboring subblock do not exceed a threshold; and based on determining that the OBMC mode is enabled and the first, second, and third (Continued)

conditions are met, determining not to use motion information of the neighboring subblock for motion compensation of the current subblock.

33 Claims, 13 Drawing Sheets

(51) Int. Cl.
*H04N 19/176* (2014.01)
*H04N 19/513* (2014.01)
*H04N 19/573* (2014.01)

(56) References Cited

OTHER PUBLICATIONS

International Search Report and Written Opinion—PCT/US2021/072601—ISA/EPO—Mar. 14, 2022.
Xiu (InterDigital) X, et al., "Description of SDR, HDR and 360° Video Coding Technology Proposal by InterDigital Communications and Dolby Laboratories", 10. JVET Meeting, Apr. 10, 2018-Apr. 20, 2018, San Diego, (The Joint Video Exploration Team of ISO/IEC JTC1/SC29/WG11 and ITU-T SG.16), No. JVET-J0015, Apr. 14, 2018, XP030248211, 82 Pages.

\* cited by examiner

700

| 2a | a+b+c | a+b+c | 2a |
|---|---|---|---|
| a+b+c | 2b+2c | 2b+2c | a+b+c |
| a+b+c | 2b+2c | 2b+2c | a+b+c |
| 2a | a+b+c | a+b+c | 2a |

| 2a | a+b | a+b | 2a |
|---|---|---|---|
| a+b | 2b | 2b | a+b |
| a+b | 2b | 2b | a+b |
| 2a | a+b | a+b | 2a |

FIG. 8

OVERLAPPED BLOCK MOTION COMPENSATION

CROSS-REFERENCE TO RELATED APPLICATIONS

This application claims priority to U.S. Provisional Application No. 63/129,238, filed Dec. 22, 2020, entitled "OVERLAPPED BLOCK MOTION COMPENSATION", the contents of which are hereby incorporated by reference in their entirety and for all purposes.

TECHNICAL FIELD

This application is generally related to video encoding and decoding. For example, aspects of the present disclosure relate to systems and techniques for performing overlapped block motion compensation.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding can be performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

BRIEF SUMMARY

Disclosed are systems, methods, and computer-readable media for performing overlapped block motion compensation (OBMC). According to at least one example, a method is provided for performing OBMC. An example method can include determining that an overlapped block motion compensation (OBMC) mode is enabled for a current subblock of a block of video data; for at least one neighboring subblock adjacent to the current subblock, determining whether a first condition, a second condition, and a third condition are met, the first condition comprising that all of one or more reference picture lists for predicting the current subblock are used to predict the neighboring subblock, the second condition comprising that identical one or more reference pictures are used to determine motion vectors associated with the current subblock and the neighboring subblock, and the third condition comprising that a first difference between horizontal motion vectors of the current subblock and the neighboring subblock and a second difference between vertical motion vectors of the current subblock and the neighboring subblock do not exceed a motion vector difference threshold, wherein the motion vector difference threshold is greater than zero; and based on determining to use the OBMC mode for the current subblock and determining that the first condition, the second condition, and the third condition are met, determining not to use motion information of the neighboring subblock for motion compensation of the current subblock.

According to at least one example, a non-transitory computer-readable medium is provided for OBMC. An example non-transitory computer-readable medium can include instructions that, when executed by one or more processors, cause the one or more processors to determine that an overlapped block motion compensation (OBMC) mode is enabled for a current subblock of a block of video data; for at least one neighboring subblock adjacent to the current subblock, determine whether a first condition, a second condition, and a third condition are met, the first condition comprising that all of one or more reference picture lists for predicting the current subblock are used to predict the neighboring subblock, the second condition comprising that identical one or more reference pictures are used to determine motion vectors associated with the current subblock and the neighboring subblock, and the third condition comprising that a first difference between horizontal motion vectors of the current subblock and the neighboring subblock and a second difference between vertical motion vectors of the current subblock and the neighboring subblock do not exceed a motion vector difference threshold, wherein the motion vector difference threshold is greater than zero; and based on determining to use the OBMC mode for the current subblock and determining that the first condition, the second condition, and the third condition are met, determine not to use motion information of the neighboring subblock for motion compensation of the current subblock.

According to at least one example, an apparatus is provided for OBMC. An example apparatus can include memory and one or more processors coupled to the memory, the one or more processors being configured to determine that an overlapped block motion compensation (OBMC) mode is enabled for a current subblock of a block of video data; for at least one neighboring subblock adjacent to the current subblock, determine whether a first condition, a second condition, and a third condition are met, the first condition comprising that all of one or more reference picture lists for predicting the current subblock are used to predict the neighboring subblock, the second condition comprising that identical one or more reference pictures are used to determine motion vectors associated with the current subblock and the neighboring subblock, and the third condition comprising that a first difference between horizontal motion vectors of the current subblock and the neighboring subblock and a second difference between vertical motion vectors of the current subblock and the neighboring subblock do not exceed a motion vector difference threshold, wherein the motion vector difference threshold is greater than zero; and based on determining to use the OBMC mode for the current subblock and determining that the first condition, the second condition, and the third condition are met, determine not to use motion information of the neighboring subblock for motion compensation of the current subblock.

According to at least one example, another apparatus is provided for OBMC. An example apparatus can include means for determining that an overlapped block motion compensation (OBMC) mode is enabled for a current subblock of a block of video data; for at least one neighboring subblock adjacent to the current subblock, determining whether a first condition, a second condition, and a third condition are met, the first condition comprising that all of one or more reference picture lists for predicting the current subblock are used to predict the neighboring subblock, the second condition comprising that identical one or more reference pictures are used to determine motion vectors associated with the current subblock and the neighboring subblock, and the third condition comprising that a first difference between horizontal motion vectors of the current subblock and the neighboring subblock and a second difference between vertical motion vectors of the current subblock and the neighboring subblock do not exceed a motion vector difference threshold, wherein the motion vector difference threshold is greater than zero; and based on determining to use the OBMC mode for the current subblock and determining that the first condition, the second condition, and the third condition are met, determining not to use motion information of the neighboring subblock for motion compensation of the current subblock.

In some aspects, the method, non-transitory computer-readable medium, and apparatuses described above can include, based on a determination to use a decoder side motion vector refinement (DMVR) mode, a subblock-based temporal motion vector prediction (SbTMVP) mode, or an affine motion compensation prediction mode for the current subblock, determining to perform a subblock-boundary OBMC mode for the current subblock.

In some cases, performing the subblock-boundary OBMC mode for the current subblock can include: determining a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock; determining a sixth prediction based on a result of applying a first weight to the first prediction, a second weight to the second prediction, a third weight to the third prediction, a fourth weight to the fourth prediction, and a fifth weight to the fifth prediction; and generating, based on the sixth prediction, a blended subblock corresponding to the current subblock.

In some examples, each of the second weight, the third weight, the fourth weight, and the fifth weight can include one or more weight values associated with one or more samples from a corresponding subblock of the current subblock. In some cases, a sum of weight values of corner samples of the current subblock is larger than a sum of weight values of other boundary samples of the current subblock. In some examples, the sum of weight values of the other boundary samples of the current subblock is larger than a sum of weight values of non-boundary samples of the current subblock.

In some aspects, the method, non-transitory computer-readable medium, and apparatuses described above can include determining to use a local illumination compensation (LIC) mode for an additional block of video data; and based on a determination to use the LIC mode for the additional block, skipping signaling of information associated with an OBMC mode for the additional block.

In some cases, skipping signaling of information associated with the OBMC mode for the additional block can include signaling a syntax flag with an empty value, the syntax flag being associated with the OBMC mode.

In some aspects, the method, non-transitory computer-readable medium, and apparatuses described above can include receiving a signal including a syntax flag with an empty value, the syntax flag being associated with an OBMC mode for an additional block of video data. In some aspects, the method, non-transitory computer-readable medium, and apparatuses described above can include, based on the syntax flag with the empty value, determining not to use the OBMC mode for the additional block.

In some examples, skipping signaling of information associated with the OBMC mode for the additional block can include based on the determination to use the LIC mode for the additional block, determining not to use or enable OBMC mode for the additional block; and skipping signaling a value associated with the OBMC mode for the additional block.

In some aspects, the method, non-transitory computer-readable medium, and apparatuses described above can include determining whether the OBMC mode is enabled for the additional block; and based on determining whether the OBMC mode is enabled for the additional block and the determination to use the LIC mode for the additional block, determining to skip signaling information associated with the OBMC mode for the additional block.

In some aspects, the method, non-transitory computer-readable medium, and apparatuses described above can include determining to use a coding unit (CU)-boundary OBMC mode for the current subblock of the block of video data; and determining a final prediction for the current subblock based on a sum of a first result of applying a weight associated with the current subblock to a respective prediction associated with the current subblock and a second result of applying one or more respective weights to one or more respective predictions associated with one or more subblocks adjacent to the current subblock.

In some examples, determining not to use motion information of the neighboring subblock for motion compensation of the current subblock can include skipping use of motion information of the neighboring subblock for motion compensation of the current subblock.

In some examples, the OBMC mode can include a subblock-boundary OBMC mode.

In some aspects, one or more of the apparatuses described above is, can be part of, or can include a mobile device, a camera device, an encoder, a decoder, an Internet-of-Things (IoT) device, and/or an extended reality (XR) device (e.g., a virtual reality (VR) device, an augmented reality (AR) device, or a mixed reality (MR) device). In some aspects, the apparatus includes a camera device. In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 7 and FIG. 8 are tables illustrating examples of sums of weighting factors from overlapped block motion compensation subblocks used for overlapped block motion compensation, in accordance with some examples of the disclosure;

DETAILED DESCRIPTION

Figure 1:
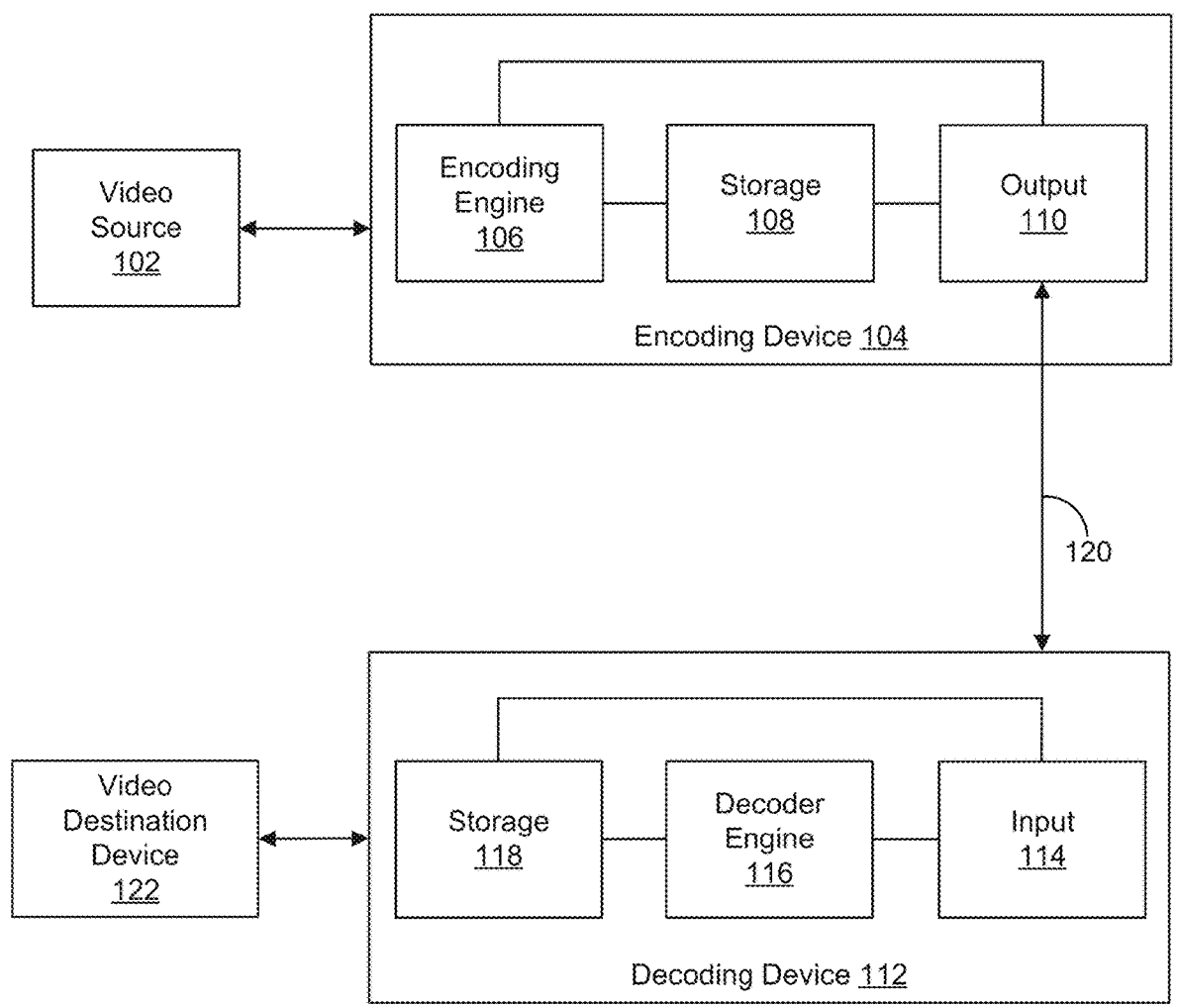
FIG. 1 is a block diagram illustrating an example of an encoding device and a decoding device, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Video compression techniques used in video coding can include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Motion compensation is generally used in the coding of video data for video compression. In some examples, motion compensation can include and/or implement an algorithmic technique used to predict a frame in a video based on the previous and/or future frames of the video, by accounting for motion of the camera and/or elements (e.g., objects, etc.) in the video. Motion compensation can describe a picture in terms of the transformation of a reference picture to the current picture. The reference picture may be a picture that is previous in time or even from the future. In some examples, motion compensation can improve compression efficiency by allowing images to be accurately synthesized from previously transmitted and/or stored images.

One example of a motion compensation technique includes block motion compensation (BMC), also referred to as motion-compensated discrete cosine transform (MC DCT), where frames are partitioned into non-overlapping blocks of pixels and each block is predicted from one or more blocks in one or more reference frames. In BMC, the blocks are shifted to the position of the predicted block. Such shift is represented by a motion vector (MV) or motion compensation vector. To exploit the redundancy between neighboring block vectors, BMC may be used to encode only the difference between the current and a previous motion vector in a video bitstream. In some cases, BMC may introduce discontinuities at the block borders (e.g., blocking artifacts). Such artifacts can appear in the form of sharp horizontal and vertical edges which are generally perceptible by the human eye and produce false edges and ringing effects (e.g., large coefficients in high frequency sub-bands) due to quantization of coefficients of the Fourier-related transform used for transform coding of the residual frames.

Generally, in BMC, a current reconstructed block is composed of the predicted block from the previous frame (e.g., referenced by the motion vectors) and the residual data transmitted in the bitstream for the current block. Another example of a motion compensation technique includes overlapped block motion compensation (OBMC). OBMC can increase prediction accuracy and avoid blocking artifacts. In OBMC, the prediction can be or can include a weighted sum of multiple predictions. In some cases, blocks can be larger in each dimension and can overlap with neighboring blocks. In such cases, each pixel may belong to multiple blocks. For example, in some illustrative examples, each pixel may belong to four different blocks. In such a scheme, OBMC may implement four predictions for each pixel, which are summed to compute a weighted mean.

In some cases, OBMC can be switched on and off using a particular syntax (e.g., one or more particular syntax elements) at the CU level. In some examples, there are two direction modes (e.g., top, left, right, bottom, or below) in OBMC, including a CU-boundary OBMC mode and a subblock-boundary OBMC mode. When CU-boundary OBMC mode is used, the original prediction block using the current CU MV and another prediction block using a neighboring CU MV (e.g., an "OBMC block") are blended. In some examples, the top-left subblock in the CU (e.g., the first or left-most subblock on the first/top row of the CU) has top and left OBMC blocks, and the other top-most subblocks (e.g., other subblocks on the first/top row of the CU) may only have top OBMC blocks. Other left-most subblocks (e.g., subblocks on the first column of the CU on the left side of the CU) may only have a left OBMC block.

Subblock-boundary OBMC mode may be enabled when a sub-CU coding tool is enabled in the current CU (e.g., Affine motion compensated prediction, advanced temporal motion vector prediction (ATMVP), etc.). In subblock-boundary mode, separate OBMC blocks using MVs of connected neighbouring subblocks can be sequentially blended with the original prediction block using the MV of the current subblock. In some cases, CU-boundary OBMC mode can be performed before subblock-boundary OBMC mode, and a predefined blending order for subblock-boundary OBMC mode may include top, left, bottom, and right.

A prediction based on the MV of a neighboring subblock N (e.g., subblocks above the current subblock, to the left of the current subblock, below the current subblock, and to the right of the current subblock) may be denoted as $P_N$. A prediction based on the MV of the current subblock may be denoted as $P_C$. When a subblock N contains the same motion information as the current subblock, the original prediction block may not be blended with the prediction block based on the MV of subblock N. In some cases, the samples of four rows/columns in $P_N$ may be blended with the same samples in $P_C$. In some examples, weighting factors ¼, ⅛, ¹⁄₁₆, ¹⁄₃₂ can be used for $P_N$ and corresponding weighting factors ¾, ⅞, ¹⁵⁄₁₆, ³¹⁄₃₂ can be used for $P_C$. In some cases, if the height or width of the coding block is equal to four or a CU is coded with a sub-CU mode, only two rows and/or columns in $P_N$ may be allowed for OBMC blending.

Systems, apparatuses, methods, and computer-readable media (collectively referred to as "systems and techniques" hereinafter) are described herein for performing improved video coding. In some aspects, the systems and techniques described herein can be used to perform overlapped block motion compensation (OBMC). For example, local illumination compensation (LIC) is a coding tool to change the illuminations of the current prediction block based on the reference block with a linear model using a scaling factor and an offset. In some aspects, since OBMC and LIC both tune the predictions, the systems and techniques described herein can disable OBMC when LIC is enabled, or can disable LIC when OBMC is enabled. Alternatively, in some aspects, the systems and techniques described herein can skip OBMC signaling when LIC is enabled, or skip LIC signaling when OBMC is enabled.

In some aspects, the systems and techniques described herein can implement multi-hypothesis prediction (MHP) to improve inter prediction modes such as, for example, advanced motion vector prediction (AMVP) mode, skip and merge mode, and intra mode. In some examples, the systems and techniques described herein can combine a prediction mode with an extra merge indexed prediction. The merge indexed prediction can be performed as in merge mode, where a merge index is signaled to acquire motion information for the motion compensated prediction. Because OBMC and MHP generally need access to different reference pictures for prediction, the decoder may utilize a large buffer for processing. To reduce the memory buffer, the systems and techniques described herein can disable OBMC when MHP is enabled or disable MHP when OBMC is enabled. In other examples, the systems and techniques described herein may instead skip OBMC signaling when MHP is enabled, or skip MHP signaling when OBMC is enabled. In some cases, the systems and techniques described herein may allow MHP and OBMC to be enabled concurrently when the current slice is an inter B slice.

In some video coding standards, such as VVC, a geometric partitioning mode (GEO) is supported for inter prediction. When this mode is used, a CU can be split into two parts by a geometrically located line. The location of the splitting line can be mathematically derived from the angle and offset parameters of a specific partition. Because OBMC and GEO generally need to access different reference pictures for prediction, the decoder may utilize a large buffer for processing. In some cases, to reduce the memory buffer, the systems and techniques described herein can disable OBMC when GEO is enabled, disable GEO when OBMC is enabled, skip OBMC signaling when GEO is enabled, or skip GEO signaling when OBMC is enabled. In some cases, GEO and OBMC may be allowed to be enabled concurrently when the current slice is an inter B slice.

In some video coding standards, such as VVC, affine motion compensated prediction, subblock-based temporal motion vector prediction (SbTMVP), and decoder side motion vector refinement (DMVR) may be supported for inter prediction. These coding tools generate different MVs for subblocks in a CU. SbTMVP mode can be one of the Affine merge candidates. Therefore, in some examples, the systems and techniques described herein can allow subblock-boundary OBMC mode to be enabled when the current CU uses Affine motion compensated prediction mode, when the current CU enables SbTMVP, or when the current CU enables DMVR. In some cases, the systems and techniques described herein can infer that subblock-boundary OBMC mode is enabled when the current CU enables DMVR.

In some cases, CU-Boundary OBMC mode and/or subblock-boundary OBMC mode can apply different weighting factors. In other cases, CU-Boundary OBMC mode and subblock-boundary OBMC mode can share the same weighting factors. For example, in JEM, CU-boundary OBMC mode and subblock-boundary OBMC mode can share the same weighting factors as follows: the final prediction for a blending can be denoted as $P = W_C * P_C + W_N * P_N$, where $P_N$ represents a prediction based on the MV of a neighboring subblock N (e.g., subblock above, left, below, right), $P_C$ is a prediction based on the MV of the current subblock, and CU-boundary OBMC mode and subblock-boundary OBMC mode use the same values of $W_C$ and $W_N$. The weighting factors $W_N$ can be set as $\frac{1}{4}$, $\frac{1}{8}$, $\frac{1}{16}$, $\frac{1}{32}$ for the sample row/column of the current subblock that is $1^{st}$, $2^{nd}$, $3^{rd}$, $4^{th}$ closest to the neighboring subblock N, respectively. The subblocks may have a size of 4×4. The first element $\frac{1}{4}$ is for the sample row or column that is closest to the neighboring subblock N, and the last element $\frac{1}{32}$ is for the sample row or column that is farthest to the neighboring subblock N. The weight of the current subblock, $W_C$, can equal to $1 - W_N$ (the weight of the neighboring subblock). Because the subblocks in a CU for sub-CU modes may have more connections to the neighboring blocks, the weighting factors for subblock-boundary OBMC mode can be different from those for CU-boundary OBMC mode. Therefore, the systems and techniques described herein can provide different weighting factors.

In some examples, the weighting factors can be as follows. In CU-boundary OBMC mode, $W_N$ can be set as $\{a1, b1, c1, d1\}$. Otherwise, $W_N$ can be set as $\{a2, b2, c2, d2\}$, where $\{a1, b1, c1, d1\}$ are different from $\{a2, b2, c2, d2\}$. In examples, a2 can be smaller than a1, b2 can be smaller than b1, c2 can be smaller than c1, and/or d2 can be smaller than d1.

In JEM, a predefined blending order for subblock-boundary OBMC mode is top, left, below, and right. In some cases, this order can increase compute complexity, decrease performance, result in unequal weighting, and/or create inconsistencies. In some examples, this sequential order can create problems as sequential computing is not friendly to parallel hardware designs. In some cases, this can result in unequal weighting. For example, during the blending process, the OBMC block of a neighboring subblock in a later subblock blending may contribute more to the final sample prediction value than in an earlier subblock blending. The systems and techniques described herein can blend the prediction values of the current subblock with four OBMC subblocks in one formula, and fix the weighting factor without favoring a particular neighboring subblock. For example, the final prediction can be $P = w1*P_c + w2*P_{top} + w3*P_{left} + w4*P_{below} + w5*P_{right}$, where $P_{top}$ is the prediction based on the MV of the top neighboring subblock, $P_{left}$ is the prediction based on the MV of the left neighboring subblock, $P_{below}$ is the prediction based on the MV of the below neighboring subblock, $P_{right}$ is the prediction based on the MV of the right neighboring subblock, and w1, w2, w3, w4, and w5 are weighting factors. In some cases, the weight w1 can equal $1 - w2 - w3 - w4 - w5$. Because the prediction based on the MV of the neighboring subblock N may add/include/introduce noise to the samples in the row/column that is farthest to the subblock N, the systems and techniques described herein can set the values for each of the weights w2, w3, w4, and w5 to $\{a, b, c, 0\}$ for the sample row/column of the current subblock that is $\{1^{st}, 2^{nd}, 3^{rd}, 4^{th}\}$ closest to the neighboring subblock N, respectively. For example, the first element a can be for the sample row or column of the current subblock that is closest, e.g., adjacent, to the neighboring subblock N, and the last element 0 can be for the sample row or column of the current subblock that is farthest to the neighboring subblock N. To illustrate using as examples the positions (0, 0), (0, 1), and (1, 1) relative to the top-left sample of the current subblock having a size of 4×4 samples, the final prediction P(x, y) can be derived as follows:

$$P(0,0) = w1*P_c(0,0) + a*P_{top}(0,0) + a*P_{left}(0,0)$$

$$P(0,1) = w1*P_c(0,1) + b*P_{top}(0,1) + a*P_{left}(0,1) + c*P_{below}(0,1)$$

$$P(1,1) = w1*P_c(1,1) + b*P_{top}(1,1) + b*P_{left}(1,1) + c*P_{below}(1,1) + c*P_{right}(1,1)$$

An example of the sum of the weighting factors from neighboring OBMC subblocks (e.g., w2+w3+w4+w5) for a 4×4 current subblock can be as shown in table 1 below. In some cases, the weighting factors can be left-shifted to avoid division operations. For example, $\{a', b', c', 0\}$ can be set to be $\{a<<shift, b<<shift, c<<shift, 0\}$, where shift is a positive integer. In this example, the weight w1 can equal $(1<<shift) - a' - b' - c'$, and P can equal $(w1*P_c + w2*P_{top} + w3*P_{left} + w4*P_{below} + w5*P_{right}$ $(1<<(shift-1)))>>shift$. An example to set $\{a', b', c', 0\}$ is $\{15, 8, 3, 0\}$, where the values are 6 left-shifted results of the original values, and w1 equals $(1<<6) - a - b - c$. $P = (w1*P_c + w2*P_{top} + w3*P_{left} + w4*P_{below} + w5*P_{right} + (1<<5))>>6$.

TABLE 1

Sum of the weighting factors from OBMC sub-blocks for {a, b, c, 0}

| 2a | a + b + c | a + b + c | 2a |
|---|---|---|---|
| a + b + c | 2b + 2c | 2b + 2c | a + b + c |
| a + b + c | 2b + 2c | 2b + 2c | a + b + c |
| 2a | a + b + c | a + b + c | 2a |

In some aspects, the values of w2, w3, w4, and w5 can be set to $\{a, b, 0, 0\}$ for the sample row/column of the current subblock that is $\{1^{st}, 2^{nd}, 3^{rd}, 4^{th}\}$ closest to the neighboring subblock N, respectively. To illustrate using as examples the positions (0, 0), (0, 1), and (1, 1) relative to the top-left sample of the current subblock having a size of 4×4 samples, the final prediction P(x, y) can be derived as follows:

$$P(0,0) = w1*P_c(0,0) + a*P_{top}(0,0) + a*P_{left}(0,0)$$

$$P(0,1) = w1*P_c(0,1) + b*P_{top}(0,1) + a*P_{left}(0,1)$$

$$P(1,1) = w1*P_c(1,1) + b*P_{top}(1,1) + b*P_{left}(1,1)$$

An example sum of the weighting factors from neighboring OBMC subblocks (e.g., w2+w3+w4+w5) for a 4×4 current subblock is shown in Table 2 below.

TABLE 2

Sum of the weighting factors from OBMC
sub-blocks for {a, b, 0, 0}

| 2a    | a + b | a + b | 2a    |
|-------|-------|-------|-------|
| a + b | 2b    | 2b    | a + b |
| a + b | 2b    | 2b    | a + b |
| 2a    | a + b | a + b | 2a    |

In some examples, the weights may be chosen such that the sums of w2+w3+w4+w5 at corner samples (e.g., samples at (0, 0), (0, 3), (3, 0), and (3, 3)) are larger than the sums of w2+w3+w4+w5 at the other boundary samples (e.g., samples at (0, 1), (0, 2), (1, 0), (2, 0), (3, 1), (3, 2), (1, 3), and (2, 3)), and/or the sums of w2+w3+w4+w5 at the boundary samples are larger than the values at middle samples (e.g., samples at (1, 1), (1, 2), (2, 1), and (2, 2)).

In some cases, some motion compensations are skipped during the OBMC process based on the similarity between the MV of the current subblock and the MV of its spatial neighboring block/subblock (e.g., top, left, below, and right). For example, each time before motion compensation is invoked using the motion information from a given neighboring block/subblock, the MV(s) of the neighboring block(s)/subblock(s) can be compared to the MV(s) of the current subblock based on the following one or more conditions. The one or more conditions can include, for example, a first condition that all the prediction lists (e.g., either list L0 or list L1 in uni-prediction or both L0 and L1 in bi-prediction) that are used by the neighboring block/subblock are also used for the prediction of the current subblock, a second condition that the same reference picture(s) is/are used by the MV(s) of the neighboring subblock(s) and the MV(s) of the current subblock, and/or a third condition that the absolute value of the horizontal MV difference between the neighboring MV(s) and the current MV(s) is not larger than (or does not exceed) a pre-defined MV difference threshold T and the absolute value of the vertical MV difference between the neighboring MV(s) and the current MV(s) is not larger than the pre-defined MV difference threshold T (both L0 and L1 MVs can be checked if bi-prediction is used).

In some examples, if the first, second, and third conditions are met, then motion compensation using the given neighboring block/subblock is not performed, and the OBMC subblock using the MV of the given neighboring block/subblock N is disabled and not blended with the original subblock. In some cases, CU-boundary OBMC mode and subblock-boundary OBMC mode can have different values of threshold T If the mode is CU-boundary OBMC mode, T is set to T1 and, otherwise, T is set to T2, where T1 and T2 are larger than 0. In some cases, when the conditions are met, a lossy algorithm to skip the neighboring block/subblock may only be applied to subblock-boundary OBMC mode. CU-boundary OBMC mode can instead apply a lossless algorithm to skip the neighboring block/subblock when one or more conditions are met, such as a fourth condition that all the prediction lists (e.g., either L0 or L1 in uni-prediction or both L0 and L1 in bi-prediction) that are used by the neighboring block/subblock are also used for the prediction of the current subblock, a fifth condition that the same reference picture(s) is/are used by the neighboring MV(s) and the current MV(s), and a sixth condition that the neighboring MV and the current MV are the same (both L0 and L1 MVs can be checked if bi-prediction is used).

In some cases, when the first, second, and third conditions are met, the lossy algorithm to skip the neighboring block/subblock is only applied to CU-boundary OBMC mode. In some cases, subblock-boundary OBMC mode can apply a lossless algorithm to skip the neighboring block/subblock when the fourth, fifth, and sixth conditions are met.

In some aspects, in CU-boundary OBMC mode, a lossy fast algorithm can be implemented to save encoding and decoding time. For example, a first OBMC block and an adjacent OBMC block can be merged into a larger OBMC block and generated together if one or more conditions are met. The one or more conditions can include, for example, a condition that all the prediction lists (e.g., either L0 or L1 in uni-prediction or both L0 and L1 in bi-prediction) that are used by a first neighboring block of the current CU are also used for the prediction of a second neighboring block of the current CU (in the same direction as the first neighboring block), a condition that the same reference picture(s) is/are used by the MV of the first neighboring block and the MV of the second neighboring block, and a condition that the absolute value of the horizontal MV difference between the MV of the first neighboring block and the MV of the second neighboring block is not larger than a pre-defined MV difference threshold T3 and the absolute value of the vertical MV difference between the MV of the first neighboring block and the MV of the second neighboring block is not larger than the pre-defined MV difference threshold T3 (both L0 and L1 MVs can be checked if bi-prediction is used).

In some aspects, in subblock-boundary OBMC mode, a lossy fast algorithm can be implemented to save encoding and decoding time. In some examples, SbTMVP mode and DMVR are performed on an 8×8 basis, and affine motion compensation is performed on a 4×4 basis. The systems and techniques described herein can implement the subblock-boundary OBMC mode on an 8×8 basis. In some cases, the systems and techniques described herein can perform a similarity check at every 8×8 subblock to determine if the 8×8 subblock should be split into four 4×4 subblocks and, if split, OBMC is performed on a 4×4 basis. In some examples, the algorithm can include, for each 8×8 subblock, four 4×4 OBMC subblocks (e.g., P, Q, R, and S) are allowed to be enabled when at least one of the following conditions are not met: a first condition that the prediction list(s) (e.g., either L0 or L1 in uni-prediction or both L0 and L1 in bi-prediction) that are used by the subblocks P, Q, R and S are the same; a second condition that the same reference picture(s) is/are used by the MVs of the subblocks P, Q, R, and S; and a third condition that the absolute value of the horizontal MV difference between MVs of any two subblocks (e.g., P and Q, P and R, P and S, Q and R, Q and S, and R and S) is not larger than a pre-defined MV difference threshold T4 and the absolute value of the vertical MV difference between MVs of any two subblocks (e.g., P and Q, P and R, P and S, Q and R, Q and S, and R and S) is not larger than a pre-defined MV difference threshold T4 (both L0 and L1 MVs can be checked if bi-prediction is used).

If all of the above conditions are met, the systems and techniques described herein can perform 8×8 subblock OBMC, where 8×8 OBMC subblocks from top, left, below, and right MVs are generated using OBMC blending for subblock-boundary OBMC mode. Otherwise, when at least one of the above conditions is not met, OBMC is performed on a 4×4 basis in this 8×8 subblock and every 4×4 subblock in the 8×8 subblock generates four OBMC subblocks from top, left, below, and right MVs.

In some aspects, when a CU is coded with merge mode, the OBMC flag is copied from neighboring blocks, in a way similar to motion information copy in merge mode. Otherwise, when a CU is not coded with merge mode, an OBMC flag can be signalled for the CU to indicate whether OBMC applies or not.

The systems and techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, the AV1 format/codec, and/or other video coding standard in development or to be developed.

Further details regarding the systems and techniques will be described with respect to the figures.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enable parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 3

Specification of intra-prediction mode and associated names

| Intra-prediction mode | Associated name |
|---|---|
| 0 | INTRA_PLANAR |
| 1 | INTRA_DC |
| 2 . . . 34 | INTRA_ ANGULAR2 . . . INTRA_ ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector (Δx, Δy) can be in integer sample accuracy (also referred to as integer accuracy), in which case the motion vector points to the integer-pel grid (or integer-pixel sampling grid) of the reference frame. In some cases, a motion vector (Δx, Δy) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector (Δx), a vertical component of the motion vector (Δy), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax', or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into subblocks, in which case each subblock can have a different motion vector in each direction. In some examples, there are four different ways to get subblocks from an 8×8 MB partition, including: one 8×8 sub-block; two 8×4 subblocks; two 4×8 subblocks; and four 4×4 subblocks. Each subblock can have a different motion vector in each direction. Therefore, a motion vector is present in a level equal to higher than subblock.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC for example, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2A:
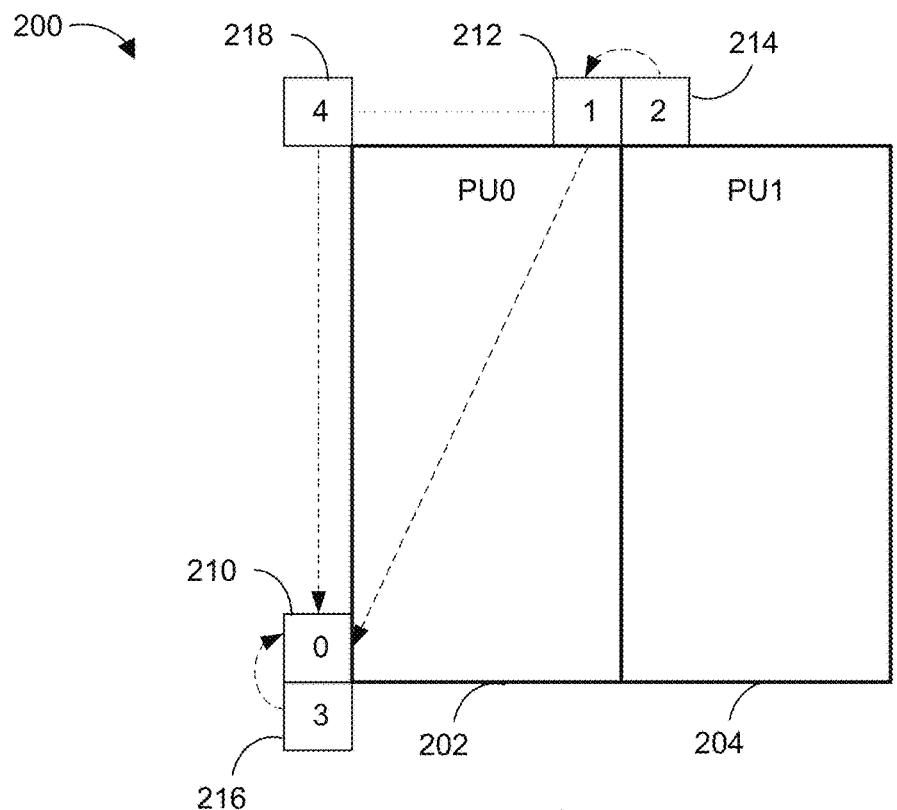
FIG. 2A is a conceptual diagram illustrating example spatial neighboring motion vector candidates for a merge mode, in accordance with some examples of the disclosure.
Figure 2B:
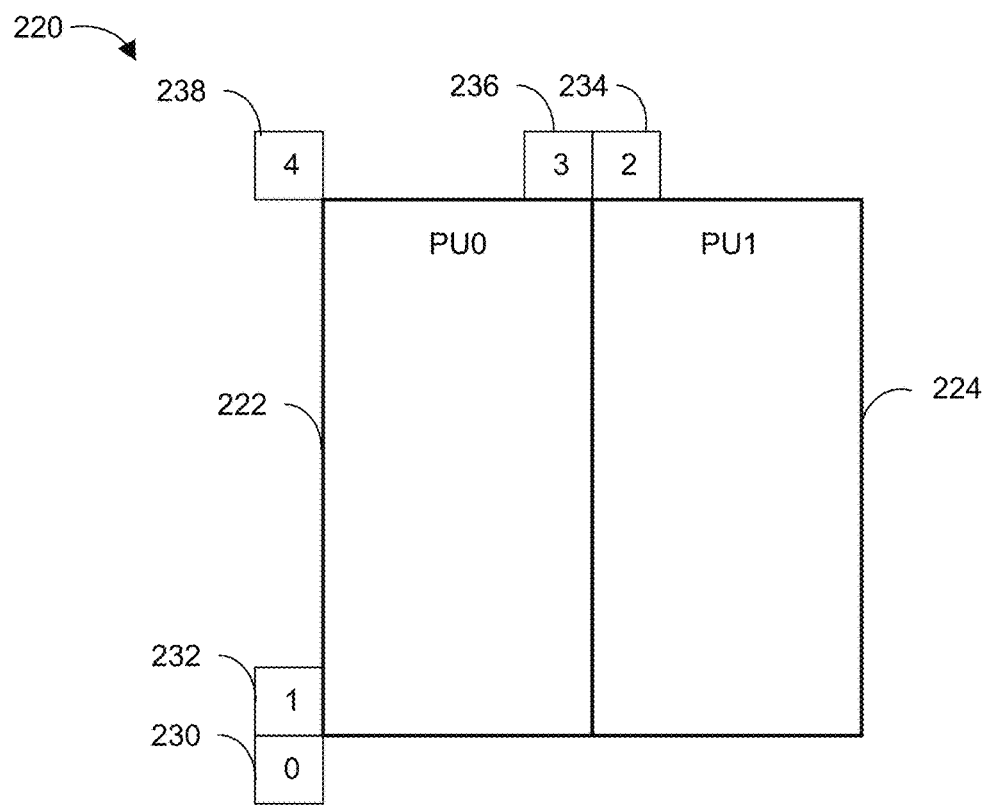
FIG. 2B is a conceptual diagram illustrating example spatial neighboring motion vector candidates for an advanced motion vector prediction (AMVP) mode, in accordance with some examples of the disclosure.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to five spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4). In FIG. 2A, block 200 includes PU0 202 and PU1 204. In some examples, when a video coder is to code motion information for PU0 202 using merge mode, the video coder can add motion information from spatial neighboring block 210, spatial neighboring block 212, spatial neighboring block 214, spatial neighboring block 216, and spatial neighboring block 218 to a candidate list, in the order described above.

In AVMP mode shown in FIG. 2B, the neighboring blocks are divided into two groups: left group including the blocks 0 and 1, and above group including the blocks 2, 3, and 4. In FIG. 2B, the blocks 0, 1, 2, 3, and 4 are labeled, respectively, as blocks 230, 232, 234, 236, and 238. Here, block 220 includes PU0 222 and PU1 224, and blocks 230, 232, 234, 236, and 238 represent spatial neighbors to PU0 222. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
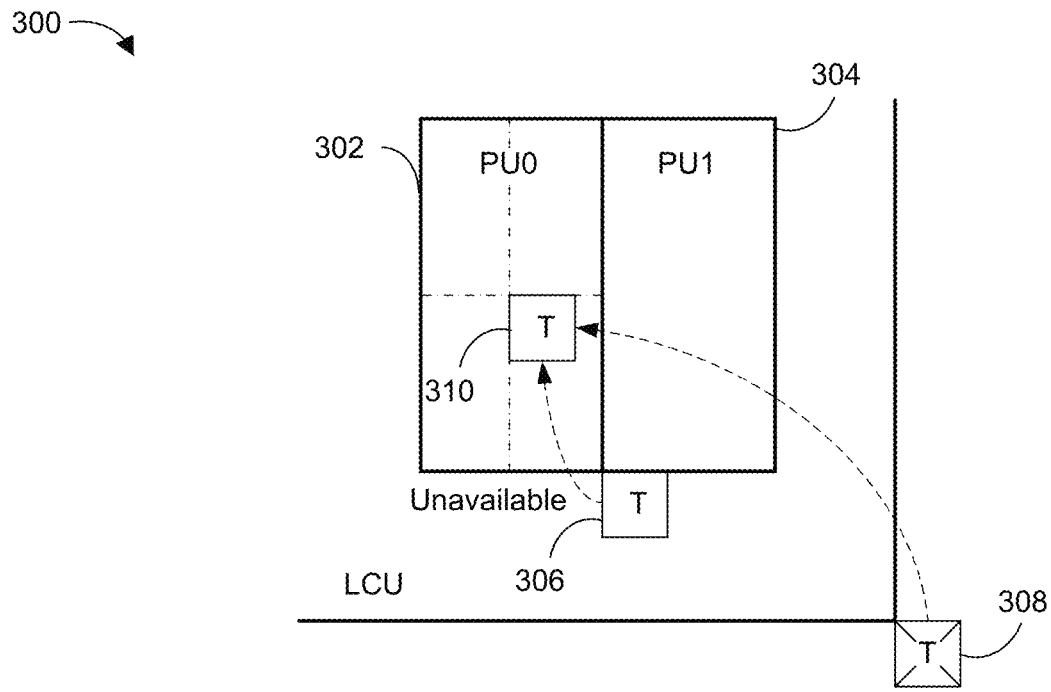
FIG. 3A is a conceptual diagram illustrating an example temporal motion vector predictor (TMVP) candidate, in accordance with some examples of the disclosure.
Figure 3B:
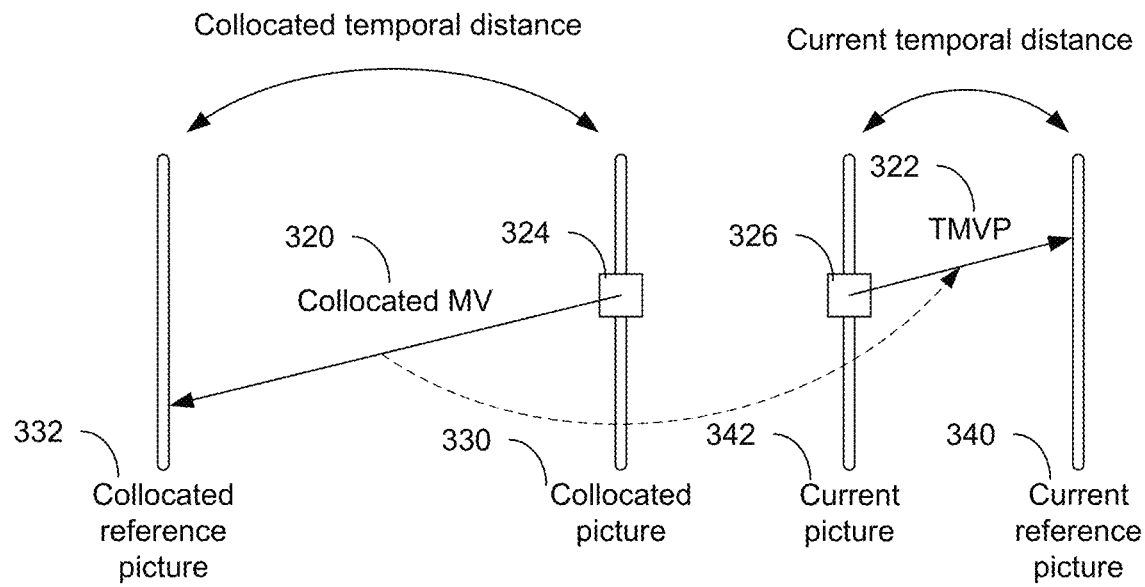
FIG. 3B is a conceptual diagram illustrating an example of motion vector scaling, in accordance with some examples of the disclosure.

FIG. 3A and FIG. 3B include conceptual diagrams illustrating temporal motion vector prediction. FIG. 3A illustrates an example CU 300 including PU0 302 and PU1 304. PU0 302 includes a center block 310 for PU0 302 and a bottom-right block 306 to PU0 302. FIG. 3A also shows an external block 308 for which motion information may be predicted from motion information of PU0 302, as discussed below. FIG. 3B illustrates a current picture 342 including a current block 326 for which motion information is to be predicted. FIG. 3B also illustrates a collocated picture 330 to current picture 342 (including collocated block 324 to current block 326), a current reference picture 340, and a collocated reference picture 332. Collocated block 324 is predicted using collocated motion vector 320, which is used as a temporal motion vector predictor (TMVP) candidate 322 for motion information of block 326.

A video coder can add a temporal motion vector predictor (TMVP) candidate (e.g., TMVP candidate 322), if enabled and available, into a MV candidate list after any spatial motion vector candidates. The process of motion vector derivation for a TMVP candidate is the same for both merge and AMVP modes. In some instances, however, the target reference index for the TMVP candidate in the merge mode is always set to zero.

The primary block location for TMVP candidate derivation is the bottom right block 306 outside of the collocated PU 304, as shown in FIG. 3A, to compensate for the bias to the above and left blocks used to generate spatial neighboring candidates. However, if block 306 is located outside of the current CTB (or LCU) row (e.g., as illustrated by block 308 in FIG. 3A) or if motion information for block 306 is not available, the block is substituted with center block 310 of PU 302.

With reference to FIG. 3B, a motion vector for TMVP candidate 322 can be derived from collocated block 324 of collocated picture 330, indicated in the slice level. Similar to temporal direct mode in AVC, a motion vector of the TMVP candidate may be subject to motion vector scaling, which is performed to compensate for distance differences between current picture 342 and current reference picture 340, and collocated picture 330 and collocated reference picture 332. That is, motion vector 320 can be scaled to produce TMVP candidate 322 based on the distance differences between a current picture (e.g., current picture 342) and a current reference picture (e.g., current reference picture 340), and a collocated picture (e.g., collocated picture 330) and a collocated reference picture (e.g., collocated reference picture 332).

Other aspects of motion prediction are covered in the HEVC standard and/or other standard, format, or codec. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. Moreover, the motion vector can be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on this comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

In certain coding schemes, such as HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figure 4A:
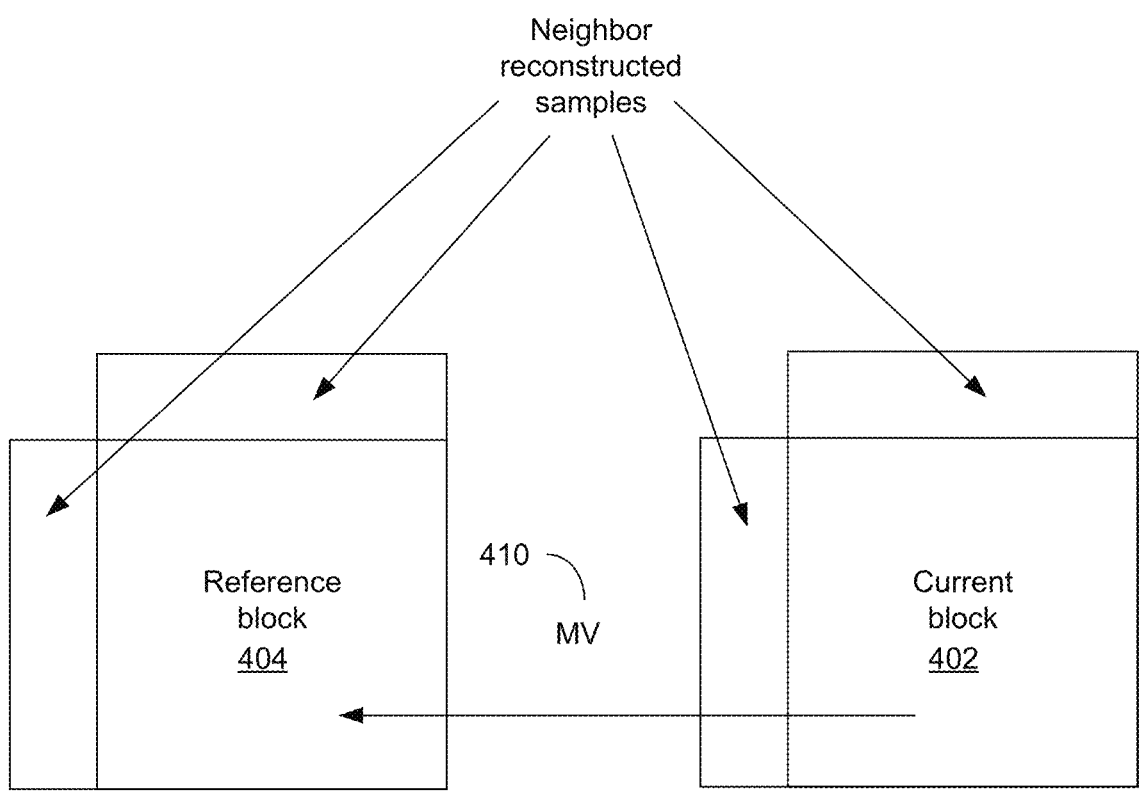
FIG. 4A is a conceptual diagram illustrating an example of neighboring samples of a current coding unit used for estimating motion compensation parameters for the current coding unit, in accordance with some examples of the disclosure.
Figure 4B:
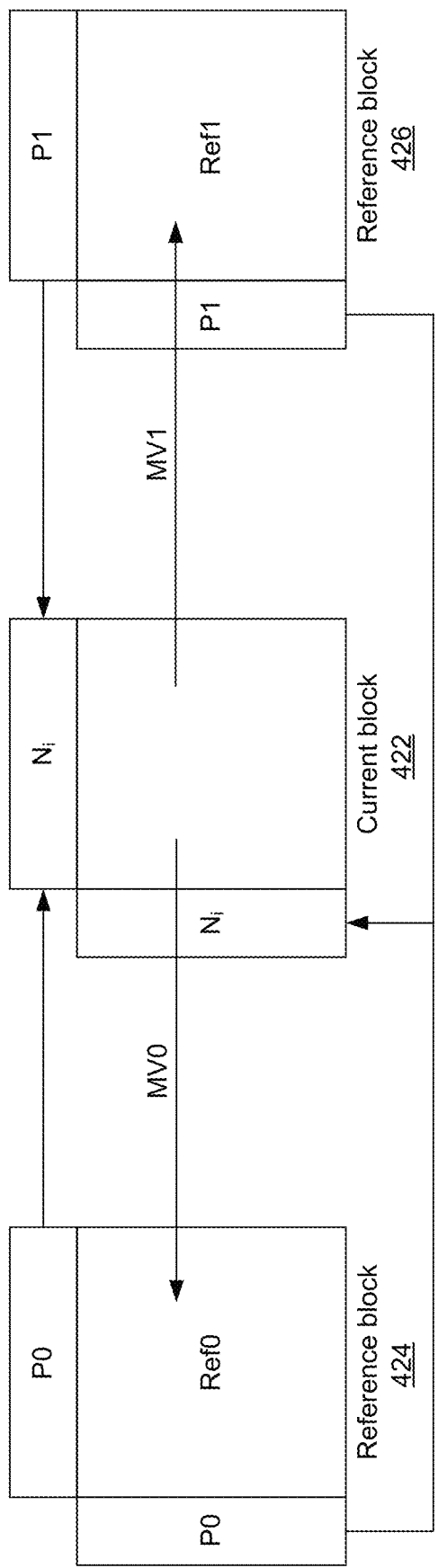
FIG. 4B is a conceptual diagram illustrating an example of neighboring samples of a reference block used for estimating motion compensation parameters for a current coding unit, in accordance with some examples of the disclosure.

FIG. 4A is a diagram illustrating an example of neighbor reconstructed samples of a current block 402 and neighbor samples of a reference block 404 used for uni-directional inter-prediction. A motion vector MV 410 can be coded for the current block 402, where the MV 410 can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In this case, two motion vectors MV0 and MV1 can be coded for the current block 422 to identify the first reference block 424 and a second reference block 426, respectively.

As previously explained, OBMC is an example motion compensation technique that can be implemented for motion compensation. OBMC can increase prediction accuracy and avoid blocking artifacts. In OBMC, the prediction can be or include a weighted sum of multiple predictions. In some cases, blocks can be larger in each dimension and can overlap quadrant-wise with neighboring blocks. Thus, each pixel may belong to multiple blocks. For example, in some illustrative cases, each pixel may belong to 4 blocks. In such a scheme, OBMC may implement four predictions for each pixel which are summed up to a weighted mean.

In some cases, OBMC can be switched on and off using a particular syntax at the CU level. In some examples, there are two direction modes (e.g., top, left, right, bottom or below) in OBMC, including a CU-boundary OBMC mode and a subblock-boundary OBMC mode. When CU-boundary OBMC mode is used, the original prediction block using the current CU MV and another prediction block using a neighboring CU MV (e.g., an "OBMC block") are blended. In some examples, the top-left subblock in the CU (e.g., the first or left-most subblock on the first/top row of the CU) has top and left OBMC blocks, and the other top-most subblocks (e.g., other subblocks on the first/top row of the CU) may only have top OBMC blocks. Other left-most subblocks (e.g., subblocks on the first column of the CU on the left side of the CU) may only have a left OBMC block.

Subblock-boundary OBMC mode may be enabled when a sub-CU coding tool is enabled in the current CU (e.g., Affine motion compensated prediction, advanced temporal motion vector prediction (ATMVP), etc.) that allows for different MVs on a subblock basis. In subblock-boundary OBMC mode, separate OBMC blocks using MVs of connected neighboring subblocks can be blended with the original prediction block using the MV of the current subblock. In some examples, in subblock-boundary OBMC mode, separate OBMC blocks using MVs of connected neighboring subblocks can be blended in parallel with the original prediction block using the MV of the current subblock, as further described herein. In other examples, in subblock-boundary mode, separate OBMC blocks using MVs of connected neighboring subblocks can be blended sequentially with the original prediction block using the MV of the current subblock. In some cases, CU-boundary OBMC mode can be performed before subblock-boundary OBMC mode, and a predefined blending order for subblock-boundary OBMC mode may include top, left, bottom, and right.

Prediction based on the MV of a neighboring subblock N (e.g., subblocks above the current subblock, to the left of the current subblock, below the current subblock, and to the right of the current subblock), may be denoted as $P_N$ and prediction based on the MV of the current subblock may be denoted as $P_C$. When a subblock N contains the same motion information as the current subblock, the original prediction block may not be blended with the prediction block based on the MV of subblock N. In some cases, the samples of 4 rows/columns in $P_N$ may be blended with the same samples in $P_C$. In some examples, weighting factors ¼, ⅛, 1/16, 1/32 can be used for $P_N$ and corresponding weighting factors ¾, ⅞, 15/16, 31/32 can be used for $P_C$. In some cases, if the height or width of the coding block is equal to 4 or a CU is coded with a sub-CU mode, only 2 rows/columns in $P_N$ may be allowed for OBMC blending.

Figure 5:
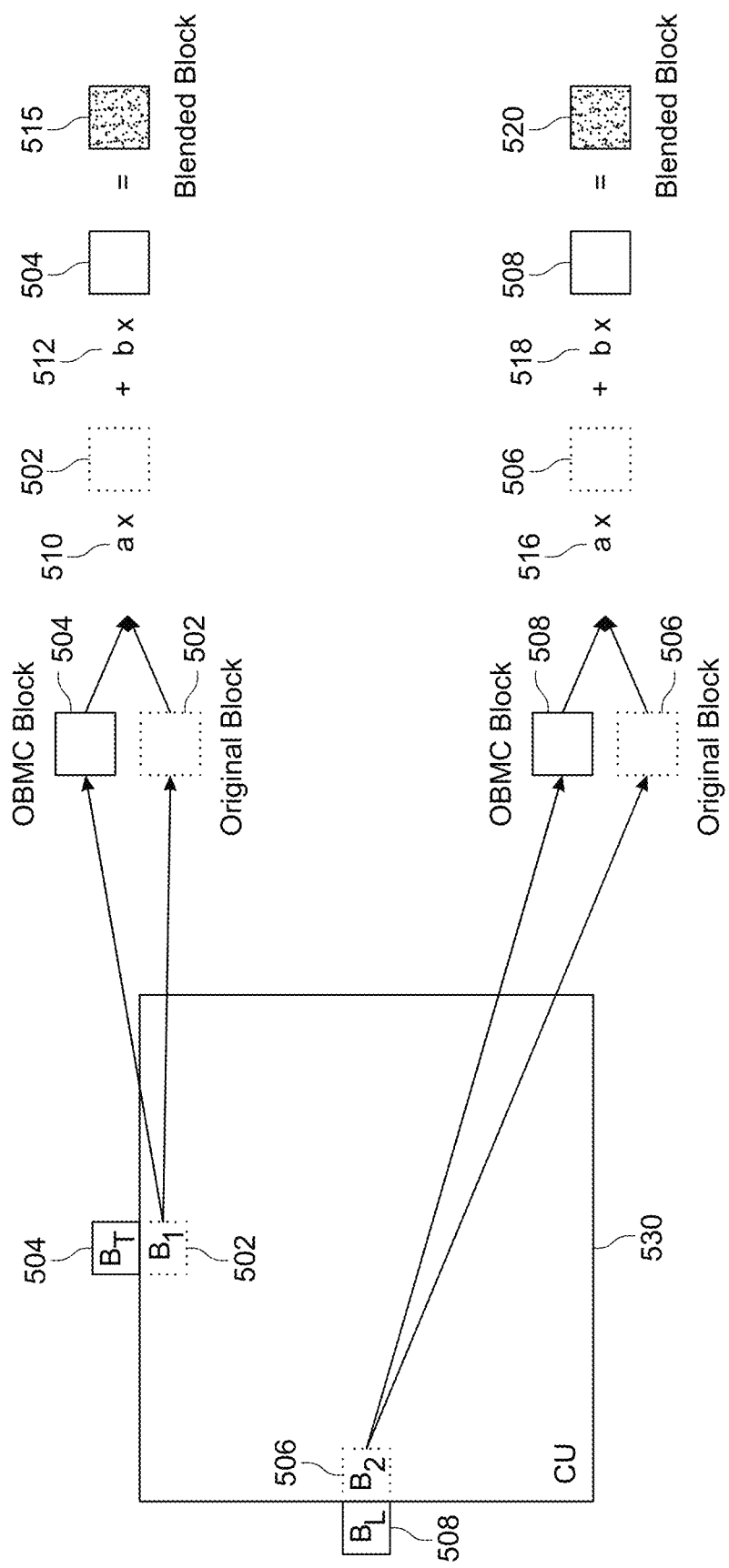
FIG. 5 is a diagram illustrating an example of overlapped block motion compensation (OBMC) blending for a coding unit boundary OBMC mode, in accordance with some examples of the disclosure.

FIG. 5 is a diagram illustrating an example of OBMC blending for a CU-boundary OBMC mode. As shown in FIG. 5, when CU-boundary OBMC mode is used, the original prediction block (denoted as "Original block" in FIG. 5) using the current CU motion vector (MV) and another prediction block (denoted as "OBMC block" in FIG. 5) using the neighboring CU MV are blended. A top-left most sub-block of CU 530 can have top and left OBMC blocks, which can be used to generate a blended block as described herein. Other top-most sub-blocks of CU 530 only have a top OBMC block, which can be used to generate a blended block as described herein. For example, sub-block 502 located at the top of CU 530 only has a top OBMC block, shown as OBMC sub-block 504 in FIG. 5. OBMC sub-block 504 may be a subblock of a top neighboring CU, which may include one or more sub-blocks. Other left-most sub-blocks of CU 530 only have a left OBMC block, which can be used to generate a blended block as described herein. For example, sub-block 506 of CU 530 only has a left OBMC block, shown as OBMC sub-block 508 in FIG. 5. OBMC sub-block 508 may be a subblock of a left neighboring CU, which may include one or more sub-blocks.

In the example shown in FIG. 5, the subblock 502 and the OBMC sub-block 504 can be used to generate blended block 515. For example, the samples of the CU 530 at the location of the subblock 502 can be predicted using MVs of subblock 502 and then be multiplied by a weight factor 510 to generate a first prediction result for the subblock 502. Similarly, the samples of the CU 530 at the location of the subblock 502 can be predicted using MVs of OBMC subblock 504 and then be multiplied by a weight factor 512 to generate a second prediction result for subblock 502. The first prediction result generated for subblock 502 can be added with the second prediction result generated for sub-block 502 to derive blended block 515. The weight factor 510 can be the same or different than the weight factor 512. In some examples, the weight factor 510 can be different than the weight factor 512. In some cases, the weight factor 510 can depend on the distance to the CU boundary (e.g., to the boundary of CU 530) of the image data and/or samples being blended from subblock 502, and the weight factor 512 can depend on the distance to the CU boundary (e.g., to the boundary of CU 530) of the image data and/or samples being blended from subblock 502. The weight factors 510 and 512 may add up to 1.

The sub-block 506 and the OBMC sub-block 508 can be used to generate blended block 520. For example, the samples of the CU 530 at the location of the subblock 506 can be predicted using MVs of subblock 506 and then be multiplied by a weight factor 516 to generate a first prediction result for the subblock 506. Similarly, the samples of the CU 530 at the location of the subblock 506 can be predicted using MVs of OBMC sub-block 508 and then be multiplied by a weight factor 518 to generate a second prediction result for subblock 506. The first prediction result generated for subblock 506 can be added with the second prediction result generated for subblock 506 to derive blended block 520. The weight factor 516 can be the same or different than the weight factor 518. In some examples, the weight factor 516 can be different than the weight factor 518. In some cases, the weight factor 516 can depend on the distance to the CU boundary (e.g., to the boundary of CU 530) of the image data and/or samples being blended from subblock 506, and the weight factor 518 can depend on the distance to the CU boundary (e.g., to the boundary of CU 530) of the image data and/or samples being blended from subblock 506.

Figure 6:
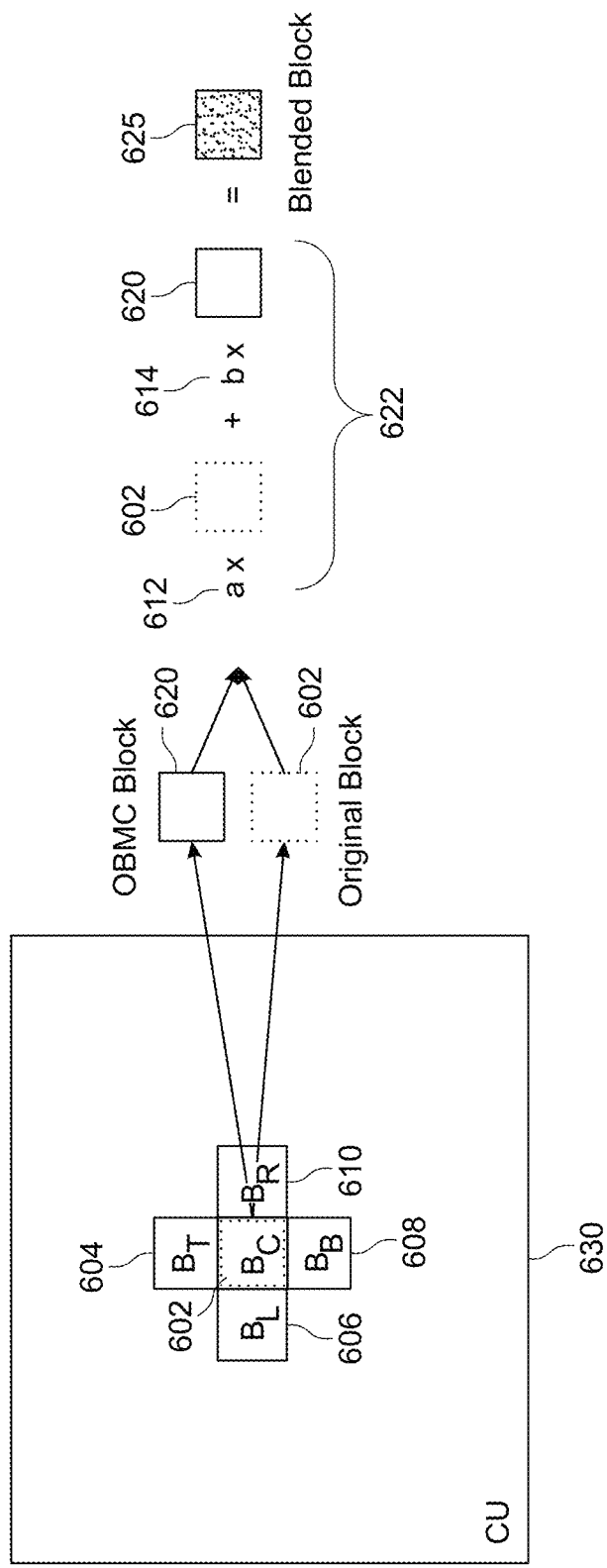
FIG. 6 is a diagram illustrating an example of overlapped block motion compensation (OBMC) blending for a sub-block-boundary OBMC mode, in accordance with some examples of the disclosure.

FIG. 6 is a diagram illustrating an example of OBMC blending for subblock-boundary OBMC mode. In some examples, subblock-boundary OBMC mode can be enabled when a sub-CU coding tool is enabled for a current CU, e.g., affine mode or tool, advanced temporal motion vector prediction (ATMVP) mode or tool, etc. As shown in FIG. 6, four separate OBMC blocks using MVs of four connected neighboring sub-blocks are blended with the original prediction block using the current subblock MV. In other words, MVs from four separate OBMC blocks are used to generate four predictions of the samples of the current subblock 602 in addition to the original prediction using the current subblock MV, and then combined with the original prediction to form the blended block 625. For example, subblock 602 of CU 630 can be blended with neighboring OBMC blocks 604 through 610. In some cases, subblock 602 can be blended with OBMC blocks 604 through 610 according to a blending order for subblock-boundary OBMC mode. In some examples, the blending order can include the top OBMC block (e.g., OBMC block 604), the left OBMC block (e.g., OBMC block 606), the bottom OBMC block (e.g., OBMC block 608), and finally the right OBMC block (e.g., OBMC block 610). In some cases, subblock 602 can be blended with OBMC blocks 604 through 610 in parallel, as further described herein.

In the example shown in FIG. 6, the subblock 602 can be blended with each OBMC block 620 according to formula 622. The formula 622 can be performed once for each of the OBMC blocks 604 through 610 and the respective results can be added to generate blended block 625. For example, the OBMC block 620 in formula 622 can represent an OBMC block used in the formula 622 from the OBMC blocks 604 through 610. In some examples, the weighing factor 612 can depend on the location of the image data and/or sample within subblock 602 being blended. In some examples, the weighing factor 612 can depend on the distance of the image data and/or sample from the respective OBMC block (e.g., OBMC block 604, OBMC block 606, OBMC block 608, OBMC block 610) being blended.

To illustrate, OBMC block 620 can represent OBMC block 604 when the prediction using the MVs of OBMC block 604 is blended with the prediction using the MVs of subblock 602 according to formula 622. Here, the original prediction of subblock 602 can be multiplied with weighing factor 612 and the result can be added with the result of multiplying the prediction using the MVs of the OBMC block 604 with weighing factor 614. OBMC block 620 can also represent OBMC block 606 when the prediction using the MVs of OBMC block 606 is blended with the prediction using the MVs of subblock 602 according to formula 622. Here, the original prediction of the subblock 602 can be multiplied with weighing factor 612 and the result can be added with the result of multiplying the prediction using the MVs of the OBMC block 606 with weighing factor 614. OBMC block 620 can further represent OBMC block 608 when the prediction using the MVs of OBMC block 608 is blended with the prediction using the MVs of subblock 602 according to formula 622. The original prediction of the subblock 602 can be multiplied with weighing factor 612 and the result can be added with the result of multiplying the prediction using the MVs of the OBMC block 608 with weighing factor 614. Finally, OBMC block 620 can represent OBMC block 610 when the prediction using the MVs of OBMC block 610 is blended with the prediction using the MVs of sub-block 602 according to formula 622. The original prediction of the subblock 602 can be multiplied with weighing factor 612 and the result can be added with the result of multiplying the prediction using the MVs of the OBMC block 610 with weighing factor 614. The results from formula 622 for each of the OBMC blocks 604 through 610 can be added to derive the blended block 625.

The parallel blending according to formula 622 can be friendly to parallel hardware compute designs, avoid or limit unequal weightings, avoid inconsistencies, etc. For example, in JEM, a predefined, sequential blending order for sub-block-boundary OBMC mode is top, left, below, and right. This order can increase compute complexity, decrease performance, result in unequal weighting, and/or create inconsistencies. In some examples, this sequential order can create problems as sequential computing is not friendly to parallel hardware designs. Moreover, this sequential order can result in unequal weighting. For example, during the blending process, the OBMC block of a neighboring subblock in a later subblock blending may contribute more to the final sample prediction value than in an earlier subblock blending.

On the other hand, the systems and techniques described herein can blend the prediction values of the current subblock with four OBMC subblocks in one formula that implements parallel blending as shown in FIG. 6, and can fix the weighting factors without favoring a particular neighboring subblock. For example, using the formula that implements parallel blending, the final prediction P can be $P = w1*P_c + w2*P_{top} + w3*P_{left} + w4*P_{below} + w5*P_{right}$, where $P_{top}$ is the prediction based on the MV of the top neighboring subblock, $P_{left}$ is the prediction based on the MV of the left neighboring subblock, $P_{below}$ is the prediction based on the MV of the below neighboring subblock, $P_{right}$ is the prediction based on the MV of the right neighboring subblock, and w1, w2, w3, w4, and w5 are respective weighting factors. In some cases, the weight w1 can equal $1-w2-w3-w4-w5$. Because the prediction based on the MV of the neighboring subblock N may add/include/introduce noise to the samples in the row/column that is farthest to the subblock N, the systems and techniques described herein can set the values for each of the weights w2, w3, w4, and w5 to {a, b, c, 0} for the sample row/column of the current subblock that is $\{1^{st}, 2^{nd}, 3^{rd}, 4^{th}\}$ closest to the neighboring subblock N, respectively.

For example, the first element a (e.g., the weighting factor a) can be for the sample row or column that is closest to the respective neighboring subblock N, and the last element 0 can be for the sample row or column that is farthest to the respective neighboring subblock N. To illustrate using as examples the positions (0, 0), (0, 1), and (1, 1) relative to the top-left sample of the current subblock having a size of 4×4 samples, the final prediction P(x, y) can be derived as follows:

$$P(0,0) = w1*P_c(0,0) + a*P_{top}(0,0) + a*P_{left}(0,0)$$

$$P(0,1) = w1*P_c(0,1) + b*P_{top}(0,1) + a*P_{left}(0,1) + c*P_{below}(0,1)$$

$$P(1,1) = w1*P_c(1,1) + b*P_{top}(1,1) + b*P_{left}(1,1) + c*P_{below}(1,1) + c*P_{right}(1,1)$$

An example sum of the weighting factors from neighboring OBMC subblocks (e.g., w2+w3+w4+w5) for a 4×4 current subblock can be as shown in table 700 shown in FIG. 7. In some cases, the weighting factors can be left-shifted to avoid division operations, which can increase compute complexity/burden and/or create inconsistencies in results. For example, {a', b', c', 0} can be set to be {a<<shift, b<<shift, c<<shift, 0}, where shift is a positive integer. In this example, the weight w1 can equal (1<<shift)−a'−b'−c', and P can equal $(w1*P_c + w2*P_{top} + w3*P_{left} + w4*P_{below} + w5*P_{right} + (1<<(shift-1)))>>shift$. An illustrative example to set {a', b', c', 0} is {15, 8, 3, 0}, where the values are 6 left-shifted results of the original values, and w1 equals (1<<6)−a−b−c. $P = (w1*P_c + w2*P_{top} + w3*P_{left} + w4*P_{below} + w5*P_{right} + (1<<5))>>6$.

In some aspects, the values of w2, w3, w4, and w5 can be set to {a, b, 0, 0} for the sample row/column of the current subblock that is $\{1^{st}, 2^{nd}, 3^{rd}, 4^{th}\}$ closest to the neighboring subblock N, respectively. To illustrate using as examples the positions (0, 0), (0, 1), and (1, 1) relative to the top-left sample of the current subblock having a size of 4×4 samples, the final prediction P(x, y) can be derived as follows:

$$P(0,0) = w1*P_c(0,0) + a*P_{top}(0,0) + a*P_{left}(0,0)$$

$$P(0,1) = w1*P_c(0,1) + b*P_{top}(0,1) + a*P_{left}(0,1)$$

$$P(1,1) = w1*P_c(1,1) + b*P_{top}(1,1) + b*P_{left}(1,1)$$

An example sum weighting factors from neighboring OBMC subblocks (e.g., w2+w3+w4+w5) for a 4×4 current subblock is shown in Table 800 shown in FIG. 8. As shown, in some examples, the weighting factors may be chosen such that the sums of w2+w3+w4+w5 at corner samples (e.g., samples at (0, 0), (0, 3), (3, 0), and (3, 3)) are larger than the sums of w2+w3+w4+w5 at the other boundary samples (e.g., samples at (0, 1), (0, 2), (1, 0), (2, 0), (3, 1), (3, 2), (1, 3), and (2, 3)), and/or the sums of w2+w3+w4+w5 at the boundary samples are larger than the values at middle samples (e.g., samples at (1, 1), (1, 2), (2, 1), and (2, 2)).

In some cases, some motion compensations can be skipped during the OBMC process based on the similarity between the MV of the current subblock and the MV of its spatial neighboring block/subblock (e.g., top, left, below, and right). For example, each time before motion compensation is invoked using the motion information from a given neighboring block/subblock, the MV(s) of the neighboring block(s)/subblock(s) can be compared to the MV(s) of the current subblock based on the following one or more conditions. The one or more conditions can include, for example, a first condition that all the prediction lists (e.g., list L0 or list L1 in uni-prediction or both L0 and L1 in bi-prediction) that are used by the neighboring block/subblock are also used for the prediction of the current subblock, a second condition that the same reference picture(s) is/are used by the MV(s) of the neighboring block(s)/subblock(s) and the MV(s) of the current subblock, and/or a third condition that the absolute value of the horizontal MV difference between the neighboring MV(s) and the current MV(s) is not larger than a pre-defined MV difference threshold T and the absolute value of the vertical MV difference between the neighboring MV(s) and the current MV(s) is not larger than the pre-defined MV difference threshold T (both L0 and L1 MVs can be checked if bi-prediction is used).

In some examples, if the first, second, and third conditions are met, motion compensation using the given neighboring block/subblock is not performed, and the OBMC subblock using the MV of the given neighboring block/subblock N is disabled and not blended with the original subblock. In some cases, CU-boundary OBMC mode and subblock-boundary OBMC mode can have different values of threshold T If the mode is CU-boundary OBMC mode, T is set to T1 and, otherwise, T is set to T2, where T1 and T2 are larger than 0. In some cases, when the conditions are met, a lossy algorithm to skip the neighboring block/subblock may only be applied to subblock-boundary OBMC mode. CU-boundary OBMC mode can instead apply a lossless algorithm to skip the neighboring block/subblock when one or more conditions are met, such as a fourth condition that all the prediction lists (e.g., either L0 or L1 in uni-prediction or both L0 and L1 in bi-prediction) that are used by the neighboring block/subblock are also used for the prediction of the current subblock, a fifth condition that the same reference picture(s) is/are used by the neighboring MV(s) and the current MV(s), and a sixth condition that the neighboring MV and the current MV are the same (both L0 and L1 MVs can be checked if bi-prediction is used).

In some cases, when the first, second, and third conditions are met, the lossy algorithm to skip the neighboring block/subblock is only applied to CU-boundary OBMC mode. In some cases, subblock-boundary OBMC mode can apply a lossless algorithm to skip the neighboring block/subblock when the fourth, fifth, and sixth conditions are met.

In some aspects, in CU-boundary OBMC mode, a lossy fast algorithm can be implemented to save encoding and decoding time. For example, a first OBMC block and an adjacent OBMC block can be merged into a larger OBMC block and generated together if one or more conditions are met. The one or more conditions can include, for example, a condition that all the prediction lists (e.g., either L0 or L1 in uni-prediction or both L0 and L1 in bi-prediction) that are used by a first neighboring block of the current CU are also used for the prediction of a second neighboring block of the current CU (in the same direction as the first neighboring block), a condition that the same reference picture(s) is/are used by the MV of the first neighboring block and the MV of the second neighboring block, and a condition that the absolute value of the horizontal MV difference between the MV of the first neighboring block and the MV of the second neighboring block is not larger than a pre-defined MV difference threshold T3 and the absolute value of the vertical MV difference between the MV of the first neighboring block and the MV of the second neighboring block is not larger than the pre-defined MV difference threshold T3 (both L0 and L1 MVs can be checked if bi-prediction is used).

In some aspects, in subblock-boundary OBMC mode, a lossy fast algorithm can be implemented to save encoding and decoding time. In some examples, SbTMVP mode and DMVR are performed on an 8×8 basis, and affine motion compensation is performed on a 4×4 basis. The systems and techniques described herein can implement the subblock-boundary OBMC mode on an 8×8 basis. In some cases, the systems and techniques described herein can perform a similarity check at every 8×8 subblock to determine if the 8×8 subblock should be split into four 4×4 subblocks and, if split, OBMC is performed on a 4×4 basis.

Figure 9:
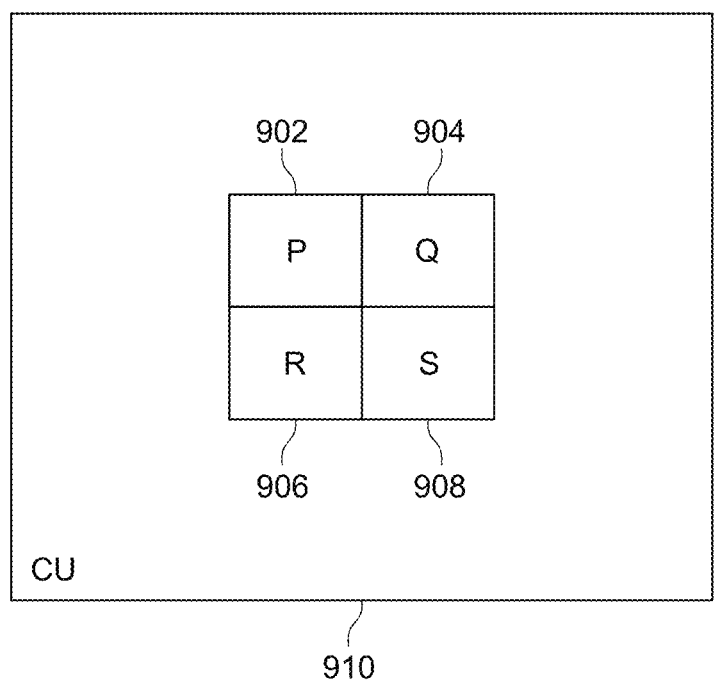
FIG. 9 is a diagram illustrating an example coding unit with sub-blocks in a block of video data, in accordance with some examples of the disclosure.

FIG. 9 is a diagram illustrating an example CU 910 with subblocks 902 through 908 in one 8×8 block. In some examples, the lossy fast algorithm in subblock-boundary OBMC mode can include, for each 8×8 subblock, four 4×4 OBMC subblocks (e.g., OBMC subblock 902 (P), OBMC subblock 904 (Q), OBMC subblock 906 (R), and OBMC subblock 908 (S)). The OBMC subblocks 902 through 908 can be enabled for OBMC blending when at least one of the following conditions are not met: a first condition that the prediction list(s) (e.g., either L0 or L1 in uni-prediction or both L0 and L1 in bi-prediction) that are used by the subblocks 902 (P), 904 (Q), 906 (R), and 908 (S) are the same; a second condition that the same reference picture(s) is/are used by the MVs of the subblocks 902 (P), 904 (Q), 906 (R), and 908 (S); and a third condition that the absolute value of the horizontal MV difference between MVs of any two subblocks (e.g., 902 (P) and 904 (Q), 902 (P) and 906 (R), 902 (P) and 908 (S), 904 (Q) and 906 (R), 904 (Q) and 908 (S), and 906 (R) and 908 (S)) is not larger than a pre-defined MV difference threshold T4 and the absolute value of the vertical MV difference between MVs of any two subblocks (e.g., 902 (P) and 904 (Q), 902 (P) and 906 (R), 902 (P) and 908 (S), 904 (Q) and 906 (R), 904 (Q) and 908 (S), and 906 (R) and 908 (S)) is not larger than a pre-defined MV difference threshold T4 (both L0 and L1 MVs can be checked if bi-prediction is used).

If all of the above conditions are met, the systems and techniques described herein can perform 8×8 subblock OBMC, where 8×8 OBMC subblocks from top, left, below, and right MVs are generated using OBMC blending for subblock-boundary OBMC mode. Otherwise, when at least one of the above conditions is not met, OBMC is performed on a 4×4 basis in this 8×8 subblock and every 4×4 subblock in the 8×8 subblock generates four OBMC subblocks from top, left, below, and right MVs.

In some aspects, when a CU is coded with merge mode, the OBMC flag is copied from neighboring blocks, in a way similar to motion information copy in merge mode. Otherwise, when a CU is not coded with merge mode, an OBMC flag can be signalled for the CU to indicate whether OBMC applies or not.

Figure 10:
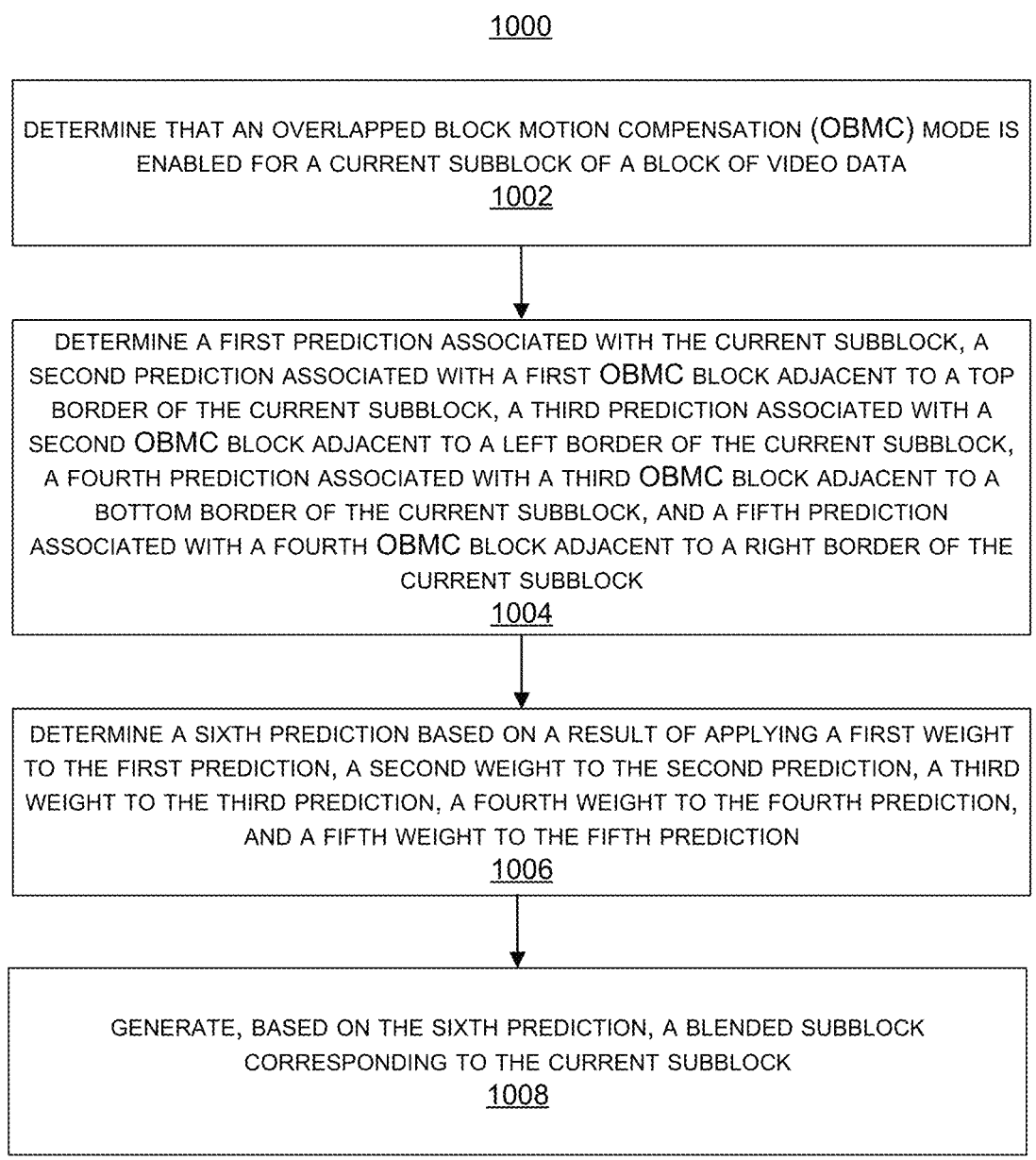
FIG. 10 is a flowchart illustrating an example process for performing overlapped block motion compensation, in accordance with some examples of the disclosure.

FIG. 10 is a flowchart illustrating an example process 1000 for performing OBMC. At block 1002, the process 1000 can include determining that an OBMC mode is enabled for a current subblock of a block of video data. In some examples, the OBMC mode can include a subblock-boundary OBMC mode.

At block 1004, the process 1000 can include determining a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock.

At block 1006, the process 1000 can include determining a sixth prediction based on a result of applying a first weight to the first prediction, a second weight to the second prediction, a third weight to the third prediction, a fourth weight to the fourth prediction, and a fifth weight to the fifth prediction. In some cases, the sum of weight values of corner samples of a corresponding subblock (e.g., the current sublock, the first OBMC block, the second OBMC block, the third OBMC block, the fourth OBMC block) can be larger than the sum of weight values of other boundary samples of the corresponding subblock. In some cases, the sum of weight values of the other boundary samples can be larger than the sum of weight values of non-boundary samples (e.g., samples that do not border a boundary of the subblock) of the corresponding subblock.

For example, in some cases, each of the first weight, the second weight, the third weight, and the fourth weight can include one or more weight values associated with one or more samples from a corresponding subblock of the current subblock, the first OBMC block, the second OBMC block, the third OBMC block, or the fourth OBMC block. Moreover, a sum of weight values of corner samples of the corresponding subblock can be larger than a sum of weight values of other boundary samples of the corresponding subblock, and the sum of weight values of the other boundary samples of the corresponding subblock can be larger than a sum of weight values of non-boundary samples of the corresponding subblock.

At block 1008, the process 1000 can include generating, based on the sixth prediction, a blended subblock corresponding to the current subblock of the block of video data.

Figure 11:
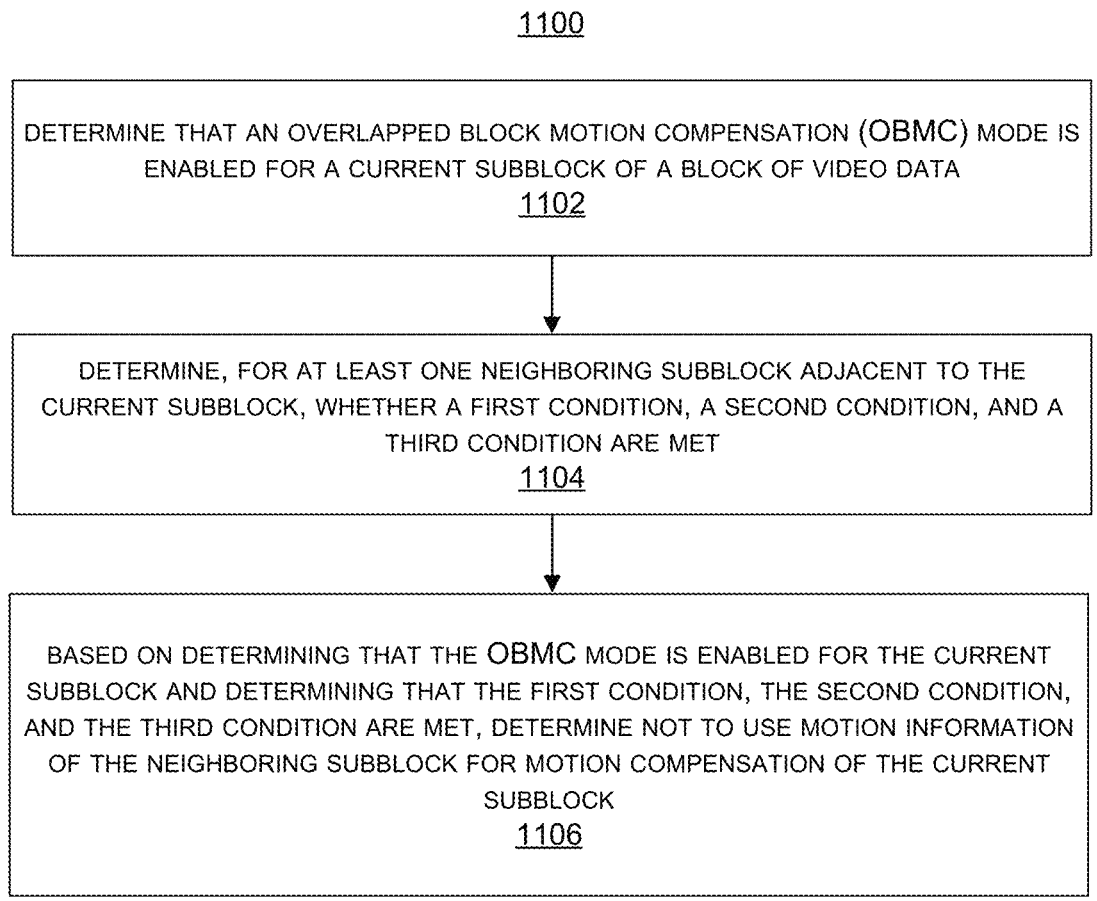
FIG. 11 is a flowchart illustrating another example process for performing overlapped block motion compensation, in accordance with some examples of the disclosure.

FIG. 11 is a flowchart illustrates another example process 1100 for performing OBMC. At block 1102, the process 1100 can include determining that an OBMC mode is enabled for a current subblock of a block of video data. In some examples, the OBMC mode can include a subblock-boundary OBMC mode.

At block 1104, the process 1100 can include determining, for at least one neighboring subblock adjacent to the current subblock, whether a first condition, a second condition, and a third condition are met. In some examples, the first condition can include that all of one or more reference picture lists for predicting the current subblock are used to predict the neighboring subblock.

In some examples, the second condition can include that identical one or more reference pictures are used to determine motion vectors associated with the current subblock and the neighboring subblock.

In some examples, the third condition can include that a first difference between horizontal motion vectors of the current subblock and the neighboring subblock and a second difference between vertical motion vectors of the current subblock and the neighboring subblock do not exceed a motion vector difference threshold. In some examples, the motion vector difference threshold is greater than zero.

At block 1106, the process 1100 can include based on determining that the OBMC mode is enabled for the current subblock and determining the first condition, the second condition, and the third condition are met, determining not to use motion information of the neighboring subblock for motion compensation of the current subblock.

In some aspects, the process 1100 can include based on a determination to use a decoder side motion vector refinement (DMVR) mode, a subblock-based temporal motion vector prediction (SbTMVP) mode, or an affine motion compensation prediction mode for the current subblock, determining to perform a subblock-boundary OBMC mode for the current subblock.

In some aspects, the process 1100 can include performing subblock-boundary OBMC mode for the subblock. In some cases, performing the subblock-boundary OBMC mode for the subblock can include determining a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock; determining a sixth prediction based on a result of applying a first weight to the first prediction, a second weight to the second prediction, a third weight to the third prediction, a fourth weight to the fourth prediction, and a fifth weight to the fifth prediction; and generating, based on the sixth prediction, a blended subblock corresponding to the current subblock.

In some cases, the sum of weight values of corner samples of a corresponding subblock (e.g., the current sublock, the first OBMC block, the second OBMC block, the third OBMC block, the fourth OBMC block) can be larger than the sum of weight values of other boundary samples of the corresponding subblock. In some cases, the sum of weight values of the other boundary samples can be larger than the sum of weight values of non-boundary samples (e.g., samples that do not border a boundary of the current subblock) of the corresponding subblock.

For example, in some cases, each of the second weight, the third weight, the fourth weight, and the fifth weight can include one or more weight values associated with one or more samples from a corresponding subblock of the current subblock. Moreover, a sum of weight values of corner samples of the current subblock can be larger than a sum of weight values of other boundary samples of the current subblock, and the sum of weight values of the other boundary samples of the current subblock can be larger than a sum of weight values of non-boundary samples of the current subblock.

In some aspects, the process 1100 can include determining to use a local illumination compensation (LIC) mode for an additional block of video data, and based on a determination to use the LIC mode for the additional block, skipping signaling of information associated with an OBMC mode for the additional block. In some examples, skipping signaling of information associated with the OBMC mode for the additional block can include signaling a syntax flag with an empty value (e.g., with no value included for the flag), the syntax flag being associated with the OBMC mode. In some aspects, the process 1100 can include receiving a signal including a syntax flag with an empty value, the syntax flag being associated with an OBMC mode for an additional block of video data. In some aspects, the process 1100 can include, based on the syntax flag with the empty value, determining not to use OBMC mode for the additional block.

In some cases, skipping signaling of information associated with the OBMC mode for the additional block can include based on the determination to use the LIC mode for the additional block, determining not to use or enable OBMC mode for the additional block, and skipping signaling a value associated with the OBMC mode for the additional block.

In some aspects, the process 1100 can include determining whether OBMC mode is enabled for the additional block, and based on determining whether OBMC mode is enabled for the additional block and the determination to use the LIC mode for the additional block, determining to skip signaling information associated with the OBMC mode for the additional block.

In some aspects, the process 1100 can include determining to use a coding unit (CU)-boundary OBMC mode for the current subblock of the block of video data, and determining a final prediction for the current subblock based on a sum of a first result of applying a weight associated with the current subblock to a respective prediction associated with the current subblock and a second result of applying one or more respective weights to one or more respective predictions associated with one or more subblocks adjacent to the current subblock.

In some examples, determining not to use motion information of the neighboring subblock for motion compensation of the current subblock can including skipping use of motion information of the neighboring subblock for motion compensation of the current subblock.

In some cases, the process 1000 and/or the process 1100 can be implemented by an encoder and/or a decoder.

In some implementations, the processes (or methods) described herein (including process 1000 and process 1100) can be performed by a computing device or an apparatus, such as the system 100 shown in FIG. 1. For example, the processes can be performed by the encoding device 104 shown in FIG. 1 and FIG. 12, by another video source-side device or video transmission device, by the decoding device 112 shown in FIG. 1 and FIG. 13, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of process 1000 and/or process 1100.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 12:
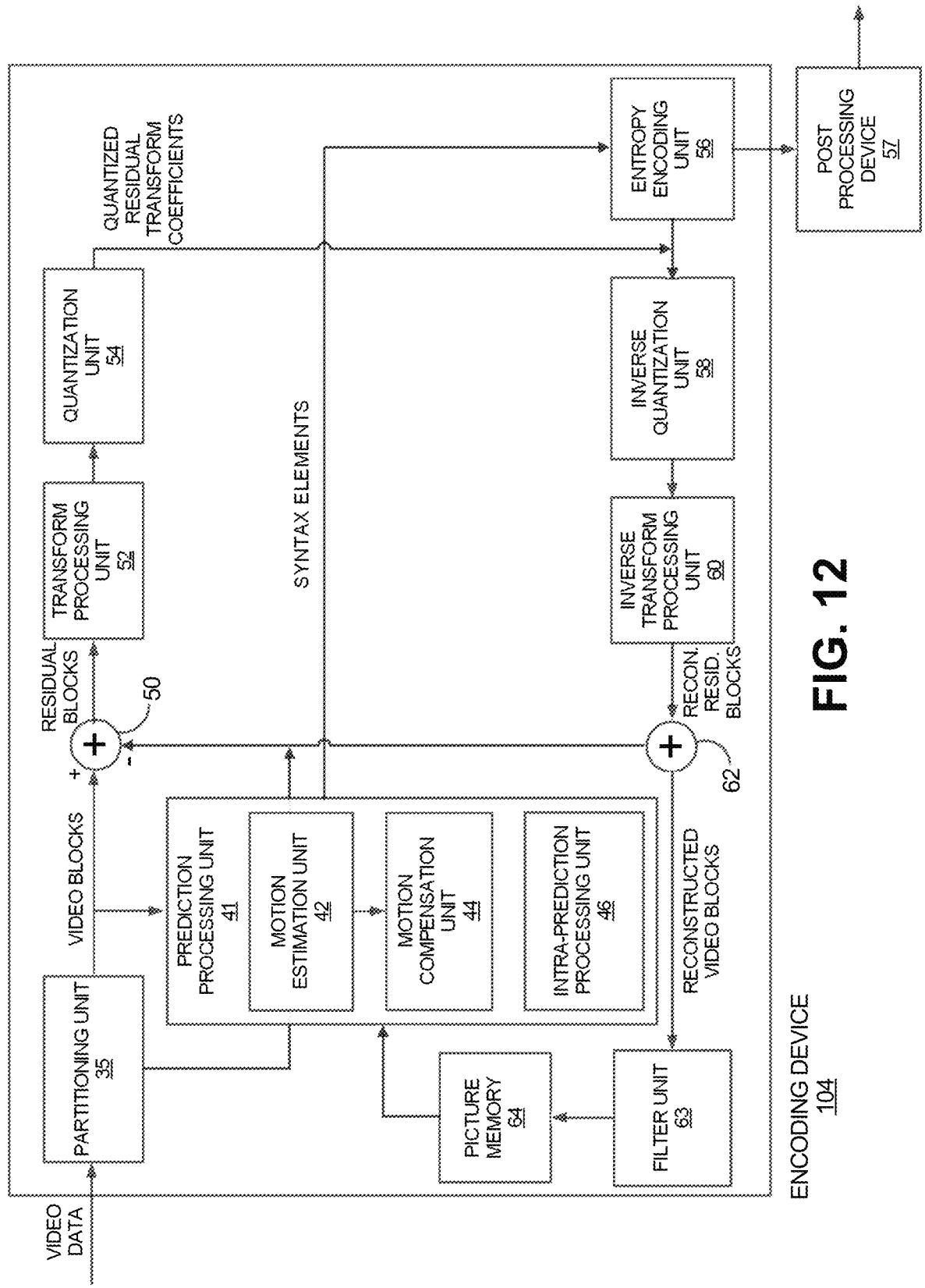
FIG. 12 is a block diagram illustrating an example video encoding device, in accordance with some examples of the disclosure.
Figure 13:
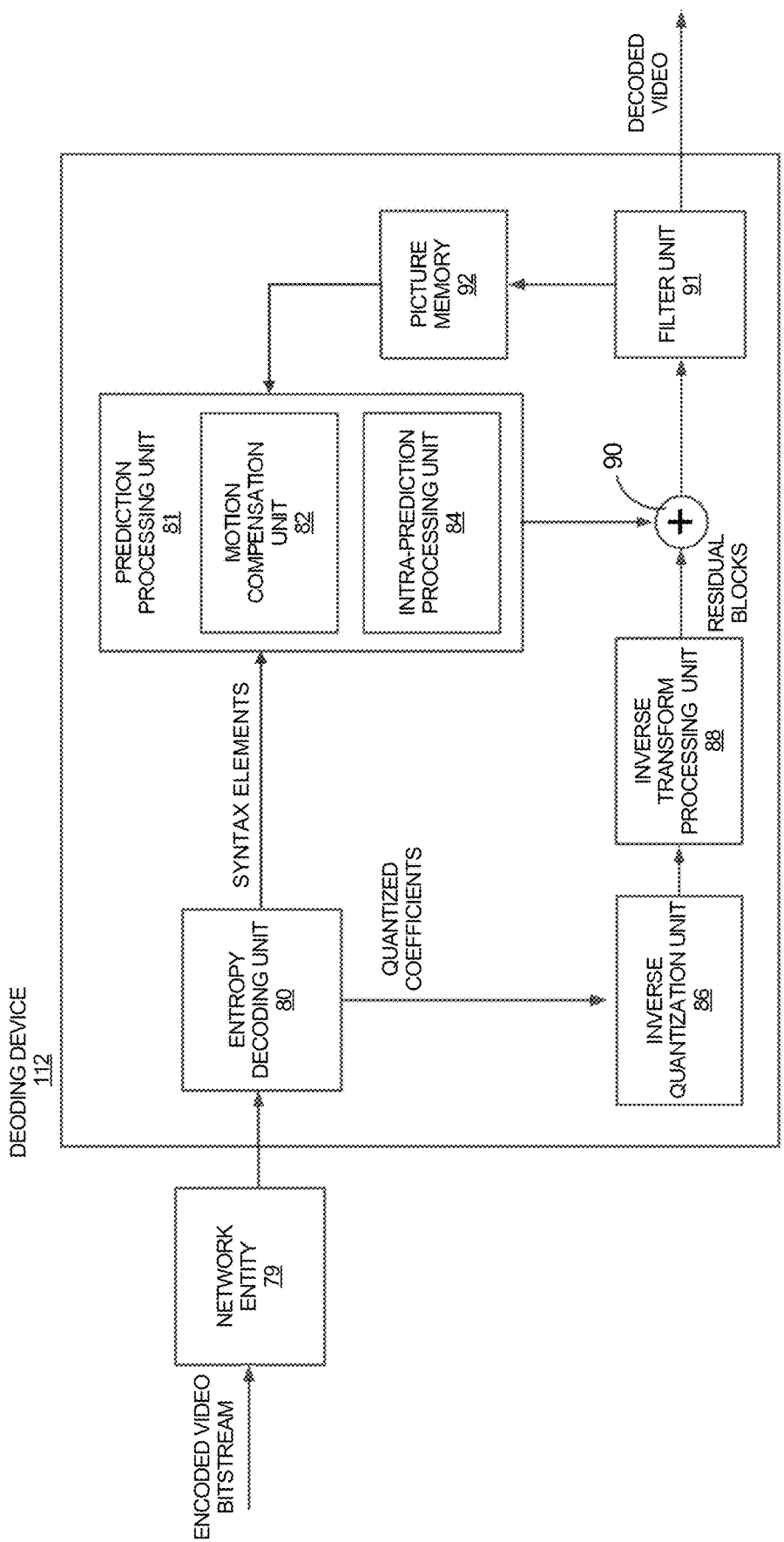
FIG. 13 is a block diagram illustrating an example video decoding device, in accordance with some examples of the disclosure.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to perform any of the techniques described herein, including the process described above with respect to FIG. 10 and/or the process described above with respect to FIG. 11. In some cases, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 13 represents an example of a video decoder configured to perform any of the techniques described herein, including the process described above with respect to FIG. 10 and the process described above with respect to FIG. 11.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1. An apparatus for processing video data, comprising: memory; and one or more processors coupled to the memory, the one or more processors being configured to: determine that an overlapped block motion compensation (OBMC) mode is enabled for a current subblock of a block of video data; for at least one neighboring subblock adjacent to the current subblock: determine whether a first condition, a second condition, and a third condition are met, the first condition comprising that all of one or more reference picture lists for predicting the current subblock are used to predict the neighboring subblock; the second condition comprising that identical one or more reference pictures are used to determine motion vectors associated with the current subblock and the neighboring subblock; and the third condition comprising that a first difference between horizontal motion vectors of the current subblock and the neighboring subblock and a second difference between vertical motion vectors of the current subblock and the neighboring subblock do not exceed a motion vector difference threshold, wherein the motion vector difference threshold is greater than zero; and based on determining that the OBMC mode is enabled for the current subblock and determining that the first condition, the second condition, and the third condition are met, determine not to use motion information of the neighboring subblock for motion compensation of the current subblock.

Aspect 2. The apparatus of Aspect 1, wherein the one or more processors are configured to: based on a determination to use a decoder side motion vector refinement (DMVR) mode, a subblock-based temporal motion vector prediction (SbTMVP) mode, or an affine motion compensation prediction mode for the current subblock, determine to perform a subblock-boundary OBMC mode for the current subblock.

Aspect 3. The apparatus of Aspect 2, wherein, to perform the subblock-boundary OBMC mode for the current subblock, the one or more processors are configured to: determine a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock; determine a sixth prediction based on a result of applying a first weight to the first prediction, a second weight to the second prediction, a third weight to the third prediction, a fourth weight to the fourth prediction, and a fifth weight to the fifth prediction; and generate, based on the sixth prediction, a blended subblock corresponding to the current subblock.

Aspect 4. The apparatus of Aspect 3, wherein each of the second weight, the third weight, the fourth weight, and the fifth weight comprises one or more weight values associated with one or more samples from a corresponding subblock of the current subblock, wherein a sum of weight values of corner samples of the current subblock is larger than a sum of weight values of other boundary samples of the current subblock.

Aspect 5. The apparatus of Aspect 4, wherein the sum of weight values of the other boundary samples of the current subblock is larger than a sum of weight values of non-boundary samples of the current subblock.

Aspect 6. The apparatus of any of Aspects 1 to 5, the one or more processors being configured: determine to use a local illumination compensation (LIC) mode for an additional block of video data; and based on a determination to use the LIC mode for the additional block, skip signaling of information associated with an OBMC mode for the additional block.

Aspect 7. The apparatus of Aspect 6, wherein, to skip signaling of information associated with the OBMC mode for the additional block, the one or more processors are configured to: signal a syntax flag with an empty value, the syntax flag being associated with the OBMC mode.

Aspect 8. The apparatus of any of Aspects 6 to 7, the one or more processors being configured to: receive a signal including a syntax flag with an empty value, the syntax flag being associated with an OBMC mode for an additional block of video data.

Aspect 9. The apparatus of any of Aspects 7 to 8, wherein the one or more processors are configured to: based on the syntax flag with the empty value, determine not to use the OBMC mode for the additional block.

Aspect 10. The apparatus of any of Aspects 6 to 9, wherein, to skip signaling of information associated with the OBMC mode for the additional block, the one or more processors are configured to: based on the determination to use the LIC mode for the additional block, determine not to use or enable OBMC mode for the additional block; and skip signaling a value associated with the OBMC mode for the additional block.

Aspect 11. The apparatus of any of Aspects 1 to 10, wherein the one or more processors are configured to: determine whether the OBMC mode is enabled for the additional block; and based on determining whether the OBMC mode is enabled for the additional block and the determination to use the LIC mode for the additional block, determine to skip signaling information associated with the OBMC mode for the additional block.

Aspect 12. The apparatus of any of Aspects 1 to 11, wherein the one or more processors are configured to: determine to use a coding unit (CU)-boundary OBMC mode for the current subblock of the block of video data; and determine a final prediction for the current subblock based on a sum of a first result of applying a weight associated with the current subblock to a respective prediction associated with the current subblock and a second result of applying one or more respective weights to one or more respective predictions associated with one or more subblocks adjacent to the current subblock.

Aspect 13. The apparatus of any of Aspects 1 to 12, wherein, to determine not to use motion information of the neighboring subblock for motion compensation of the current subblock, the one or more processors are configured to: skip use of motion information of the neighboring subblock for motion compensation of the current subblock.

Aspect 14. The apparatus of any of Aspects 1 to 13, wherein the apparatus includes a decoder.

Aspect 15. The apparatus of any of Aspects 1 to 14, further comprising a display configured to display one or more output pictures associated with the video data.

Aspect 16. The apparatus of any of Aspects 1 to 15, wherein the OBMC mode comprises a subblock-boundary OBMC mode.

Aspect 17. The apparatus of any of Aspects 1 to 16, wherein the apparatus includes an encoder.

Aspect 18. The apparatus of any of Aspects 1 to 17, further comprising a camera configured to capture pictures associated with the video data.

Aspect 19. The apparatus of any of Aspects 1 to 18, wherein the apparatus is a mobile device.

Aspect 20. A method for processing video data, comprising: determining that an overlapped block motion compensation (OBMC) mode is enabled for a current subblock of a block of video data; for at least one neighboring subblock adjacent to the current subblock, determining whether a first condition, a second condition, and a third condition are met, the first condition comprising that all of one or more reference picture lists for predicting the current subblock are used to predict the neighboring subblock; the second condition comprising that identical one or more reference pictures are used to determine motion vectors associated with the current subblock and the neighboring subblock; and the third condition comprising that a first difference between horizontal motion vectors of the current subblock and the neighboring subblock and a second difference between vertical motion vectors of the current subblock and the neighboring subblock do not exceed a motion vector difference threshold, wherein the motion vector difference threshold is greater than zero; and based on determining to use the OBMC mode for the current subblock and determining that the first condition, the second condition, and the third condition are met, determining not to use motion information of the neighboring subblock for motion compensation of the current subblock.

Aspect 21. The method of Aspect 20, further comprising: based on a determination to use a decoder side motion vector refinement (DMVR) mode, a subblock-based temporal motion vector prediction (SbTMVP) mode, or an affine motion compensation prediction mode for the current subblock, determining to perform a subblock-boundary OBMC mode for the current subblock.

Aspect 22. The method of Aspect 21, wherein performing the subblock-boundary OBMC mode for the current subblock comprises: determining a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock; determining a sixth prediction based on a result of applying a first weight to the first prediction, a second weight to the second prediction, a third weight to the third prediction, a fourth weight to the fourth prediction, and a fifth weight to the fifth prediction; and generating, based on the sixth prediction, a blended subblock corresponding to the current subblock.

Aspect 23. The method of Aspect 22, wherein each of the second weight, the third weight, the fourth weight, and the fifth weight comprises one or more weight values associated with one or more samples from a corresponding subblock of the current subblock, wherein a sum of weight values of corner samples of the current subblock is larger than a sum of weight values of other boundary samples of the current subblock.

Aspect 24. The method of Aspect 23, wherein the sum of weight values of the other boundary samples of the current subblock is larger than a sum of weight values of non-boundary samples of the current subblock.

Aspect 25. The method of any of Aspects 20 to 24, further comprising: determining to use a local illumination compensation (LIC) mode for an additional block of video data; and based on a determination to use the LIC mode for the additional block, skipping signaling of information associated with an OBMC mode for the additional block.

Aspect 26. The method of Aspect 25, wherein skipping signaling of information associated with the OBMC mode for the additional block comprises: signaling a syntax flag with an empty value, the syntax flag being associated with the OBMC mode.

Aspect 27. The method of any of Aspects 25 to 26, further comprising: receiving a signal including a syntax flag with an empty value, the syntax flag being associated with an OBMC mode for an additional block of video data.

Aspect 28. The method of any of Aspects 26 to 27, further comprising: based on the syntax flag with the empty value, determining not to use the OBMC mode for the additional block.

Aspect 29. The method of any of Aspects 25 to 28, wherein skipping signaling of information associated with the OBMC mode for the additional block comprises: based on the determination to use the LIC mode for the additional block, determining not to use or enable OBMC mode for the additional block; and skipping signaling a value associated with the OBMC mode for the additional block.

Aspect 30. The method of any of Aspects 25 to 29, further comprising: determining whether the OBMC mode is enabled for the additional block; and based on determining whether the OBMC mode is enabled for the additional block and the determination to use the LIC mode for the additional block, determining to skip signaling information associated with the OBMC mode for the additional block.

Aspect 31. The method of any of Aspects 20 to 30, further comprising: determining to use a coding unit (CU)-boundary OBMC mode for the current subblock of the block of video data; and determining a final prediction for the current subblock based on a sum of a first result of applying a weight associated with the current subblock to a respective prediction associated with the current subblock and a second result of applying one or more respective weights to one or more respective predictions associated with one or more subblocks adjacent to the current subblock.

Aspect 32. The method of any of Aspects 20 to 31, wherein determining not to use motion information of the neighboring subblock for motion compensation of the current subblock comprises: skipping use of motion information of the neighboring subblock for motion compensation of the current subblock.

Aspect 33. A non-transitory computer-readable medium having stored thereon instructions that, when executed by one or more processors, cause the one or more processors to perform a method according to any of Aspects 20 to 32.

Aspect 34. An apparatus comprising means for performing a method according to any of Aspects 20 to 32.

What is claimed is:

1. An apparatus for processing video data, comprising:
   memory; and
   one or more processors coupled to the memory, the one or more processors being configured to:

determine that an overlapped block motion compensation (OBMC) mode is enabled for a current subblock of a block within a bi-directional slice (B-slice) of video data;

for at least one neighboring subblock adjacent to the current subblock:
determine that a first condition, a second condition, and a third condition are met,
the first condition comprising that a reference picture list for uni-prediction of the current subblock was used to predict the at least one neighboring subblock, the reference picture list including an indication of reference pictures that can be used for the uni-prediction of the current subblock;
the second condition comprising that identical one or more reference pictures are used to determine motion vectors associated with the current subblock and the at least one neighboring subblock; and
the third condition comprising that a first difference between horizontal motion vectors of the current subblock and the at least one neighboring subblock and a second difference between vertical motion vectors of the current subblock and the at least one neighboring subblock do not exceed a motion vector difference threshold, wherein the motion vector difference threshold is greater than zero; and
based on the determination that the OBMC mode is enabled for the current subblock and the determination that the first condition, the second condition, and the third condition are met, determine not to use motion information of the at least one neighboring subblock for motion compensation of the current subblock.

2. The apparatus of claim 1, wherein the one or more processors are configured to:
based on a determination to use a decoder side motion vector refinement (DMVR) mode, a subblock-based temporal motion vector prediction (SbTMVP) mode, or an affine motion compensation prediction mode for the current subblock, determine to perform a subblock-boundary OBMC mode for the current subblock.

3. The apparatus of claim 2, wherein, to perform the subblock-boundary OBMC mode for the current subblock, the one or more processors are configured to:
determine a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock;
determine a sixth prediction based on a result of applying a first weight to the first prediction, a second weight to the second prediction, a third weight to the third prediction, a fourth weight to the fourth prediction, and a fifth weight to the fifth prediction; and
generate, based on the sixth prediction, a blended subblock corresponding to the current subblock.

4. The apparatus of claim 3, wherein each of the second weight, the third weight, the fourth weight, and the fifth weight comprises one or more weight values associated with one or more samples from a corresponding subblock of the current subblock, wherein a sum of weight values of corner samples of the current subblock is larger than a sum of weight values of other boundary samples of the current subblock.

5. The apparatus of claim 4, wherein the sum of weight values of the other boundary samples of the current subblock is larger than a sum of weight values of non-boundary samples of the current subblock.

6. The apparatus of claim 1, the one or more processors being configured:
determine to use a local illumination compensation (LIC) mode for an additional block of video data; and
based on the determination to use the LIC mode for the additional block, not signal information associated with an OBMC mode for the additional block.

7. The apparatus of claim 6, wherein, to not signal information associated with the OBMC mode for the additional block, the one or more processors are configured to:
signal a syntax flag with an empty value, the syntax flag being associated with the OBMC mode.

8. The apparatus of claim 1, the one or more processors being configured to:
receive a signal including a syntax flag with an empty value, the syntax flag being associated with an OBMC mode for an additional block of video data.

9. The apparatus of claim 8, wherein the one or more processors are configured to:
based on the syntax flag with the empty value, determine not to use the OBMC mode for the additional block.

10. The apparatus of claim 6, wherein, to not signal information associated with the OBMC mode for the additional block, the one or more processors are configured to:
based on the determination to use the LIC mode for the additional block, determine not to use or to enable OBMC mode for the additional block; and
not signal a value associated with the OBMC mode for the additional block.

11. The apparatus of claim 6, wherein the one or more processors are configured to:
determine whether the OBMC mode is enabled for the additional block; and
based on the determination of whether the OBMC mode is enabled for the additional block and the determination to use the LIC mode for the additional block, determine whether to skip signaling information associated with the OBMC mode for the additional block.

12. The apparatus of claim 1, wherein the one or more processors are configured to:
determine to use a coding unit (CU)-boundary OBMC mode for the current subblock of the block of video data; and
determine a final prediction for the current subblock based on a sum of a first result of applying a weight associated with the current subblock to a respective prediction associated with the current subblock and a second result of applying one or more respective weights to one or more respective predictions associated with one or more subblocks adjacent to the current subblock.

13. The apparatus of claim 1, wherein, to determine not to use motion information of the at least one neighboring subblock for motion compensation of the current subblock, the one or more processors are configured to:
not use motion information of the at least one neighboring subblock for motion compensation of the current subblock.

14. The apparatus of claim 1, wherein the apparatus includes a decoder.

15. The apparatus of claim 14, further comprising a display configured to display one or more output pictures associated with the video data.

16. The apparatus of claim 1, wherein the OBMC mode comprises a subblock-boundary OBMC mode.

17. The apparatus of claim 1, wherein the apparatus includes an encoder.

18. The apparatus of claim 17, further comprising a camera configured to capture pictures associated with the video data.

19. The apparatus of claim 1, wherein the apparatus is a mobile device.

20. A method for processing video data, comprising:
determining that an overlapped block motion compensation (OBMC) mode is enabled for a current subblock of a block within a bi-directional slice (B-slice) of video data;
for at least one neighboring subblock adjacent to the current subblock, determining that a first condition, a second condition, and a third condition are met,
the first condition comprising that a reference picture list for uni-prediction of the current subblock was used to predict the at least one neighboring subblock, the reference picture list including an indication of reference pictures that can be used for the uni-prediction of the current subblock;
the second condition comprising that identical one or more reference pictures are used to determine motion vectors associated with the current subblock and the at least one neighboring subblock; and
the third condition comprising that a first difference between horizontal motion vectors of the current subblock and the at least one neighboring subblock and a second difference between vertical motion vectors of the current subblock and the at least one neighboring subblock do not exceed a motion vector difference threshold, wherein the motion vector difference threshold is greater than zero; and
based on the determination to use the OBMC mode for the current subblock and the determination that the first condition, the second condition, and the third condition are met, determining not to use motion information of the at least one neighboring subblock for motion compensation of the current subblock.

21. The method of claim 20, further comprising:
based on a determination to use a decoder side motion vector refinement (DMVR) mode, a subblock-based temporal motion vector prediction (SbTMVP) mode, or an affine motion compensation prediction mode for the current subblock, determining to perform a subblock-boundary OBMC mode for the current subblock.

22. The method of claim 21, wherein performing the subblock-boundary OBMC mode for the current subblock comprises:
determining a first prediction associated with the current subblock, a second prediction associated with a first OBMC block adjacent to a top border of the current subblock, a third prediction associated with a second OBMC block adjacent to a left border of the current subblock, a fourth prediction associated with a third OBMC block adjacent to a bottom border of the current subblock, and a fifth prediction associated with a fourth OBMC block adjacent to a right border of the current subblock;
determining a sixth prediction based on a result of applying a first weight to the first prediction, a second weight to the second prediction, a third weight to the third prediction, a fourth weight to the fourth prediction, and a fifth weight to the fifth prediction; and
generating, based on the sixth prediction, a blended subblock corresponding to the current subblock.

23. The method of claim 22, wherein each of the second weight, the third weight, the fourth weight, and the fifth weight comprises one or more weight values associated with one or more samples from a corresponding subblock of the current subblock, wherein a sum of weight values of corner samples of the current subblock is larger than a sum of weight values of other boundary samples of the current subblock.

24. The method of claim 23, wherein the sum of weight values of the other boundary samples of the current subblock is larger than a sum of weight values of non-boundary samples of the current subblock.

25. The method of claim 20, further comprising:
determining to use a local illumination compensation (LIC) mode for an additional block of video data; and
based on the determination to use the LIC mode for the additional block, not signaling information associated with an OBMC mode for the additional block.

26. The method of claim 25, wherein not signaling information associated with the OBMC mode for the additional block comprises:
signaling a syntax flag with an empty value, the syntax flag being associated with the OBMC mode.

27. The method of claim 20, further comprising:
receiving a signal including a syntax flag with an empty value, the syntax flag being associated with an OBMC mode for an additional block of video data.

28. The method of claim 27, further comprising:
based on the syntax flag with the empty value, determining not to use the OBMC mode for the additional block.

29. The method of claim 25, wherein not signaling information associated with the OBMC mode for the additional block comprises:
based on the determination to use the LIC mode for the additional block, determining not to use or to enable OBMC mode for the additional block; and
not signaling a value associated with the OBMC mode for the additional block.

30. The method of claim 25, further comprising:
determining whether the OBMC mode is enabled for the additional block; and
based on the determination of whether the OBMC mode is enabled for the additional block and the determination to use the LIC mode for the additional block, determining whether to not signal information associated with the OBMC mode for the additional block.

31. The method of claim 20, further comprising:
determining to use a coding unit (CU)-boundary OBMC mode for the current subblock of the block of video data; and
determining a final prediction for the current subblock based on a sum of a first result of applying a weight associated with the current subblock to a respective prediction associated with the current subblock and a second result of applying one or more respective weights to one or more respective predictions associated with one or more subblocks adjacent to the current subblock.

32. The method of claim 20, wherein determining not to use motion information of the at least one neighboring subblock for motion compensation of the current subblock comprises:
  skipping use of motion information of the at least one neighboring subblock for motion compensation of the current subblock.

33. The method of claim 20, wherein the OBMC mode comprises a subblock-boundary OBMC mode.